US006669597B1

(12) United States Patent
Usoro et al.

(10) Patent No.: US 6,669,597 B1
(45) Date of Patent: Dec. 30, 2003

(54) TRANSMISSION MECHANISMS WITH THREE PLANETARY GEAR SETS AND A STATIONARY FIXED INTERCONNECTION

(75) Inventors: Patrick Benedict Usoro, Troy, MI (US); Madhusudan Raghavan, West Bloomfield, MI (US); Norman Kenneth Bucknor, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/174,332

(22) Filed: Jun. 18, 2002

(51) Int. Cl.[7] .............................................. F16H 3/44

(52) U.S. Cl. ...................... 475/323; 475/275; 475/296; 475/326

(58) Field of Search ................................ 475/275, 296, 475/323, 325, 326, 327, 328

(56) References Cited

U.S. PATENT DOCUMENTS

| | | | | | |
|---|---|---|---|---|---|
| 4,070,927 | A | | 1/1978 | Polak | 74/765 |
| 4,683,776 | A | * | 8/1987 | Klemen | 475/286 |
| 4,709,594 | A | | 12/1987 | Maeda | 74/753 |
| 5,106,352 | A | | 4/1992 | Lepelletier | 475/280 |
| 5,342,258 | A | * | 8/1994 | Egyed | 475/281 |
| 5,599,251 | A | | 2/1997 | Beim et al. | 475/275 |
| 6,053,839 | A | | 4/2000 | Baldwin et al. | 475/281 |
| 6,071,208 | A | | 6/2000 | Koivunen | 475/275 |
| 6,083,135 | A | | 7/2000 | Baldwin et al. | 475/276 |
| 6,217,474 | B1 | | 4/2001 | Ross et al. | 475/269 |
| 2003/0008747 | A1 | * | 1/2003 | Tabata et al. | 475/276 |
| 2003/0054916 | A1 | * | 3/2003 | Usoro et al. | 475/296 |
| 2003/0078132 | A1 | * | 4/2003 | Tabata et al. | 475/280 |

FOREIGN PATENT DOCUMENTS

| | | | | |
|---|---|---|---|---|
| JP | 9-126283 | | 5/1997 | |
| WO | 9409292 | * | 4/1994 | 475/275 |

* cited by examiner

*Primary Examiner*—Ha Ho
(74) *Attorney, Agent, or Firm*—Kathryn A. Marra

(57) ABSTRACT

The family of transmissions has a plurality of members that can be utilized in powertrains to provide at least seven forward speed ratios and one reverse speed ratio. The transmission family members include three planetary gear sets having six torque-transmitting mechanisms. A fixed interconnection continuously connects members of the first and second planetary gear sets with the transmission housing. The powertrain includes an engine and torque converter that is continuously connected to one of the planetary gear members and an output member that is continuously connected with another one of the planetary gear members. The six torque-transmitting mechanisms provide interconnections between various gear members, the input shaft, the output shaft, and with the transmission housing, and are operated in combinations of three to establish at least seven forward speed ratios and one reverse speed ratio.

14 Claims, 15 Drawing Sheets

| | RATIOS | 50 | 52 | 54 | 56 | 58 | 59 |
|---|---|---|---|---|---|---|---|
| REVERSE | -2.72 | | X | X | | | X |
| NEUTRAL | 0 | | X | X | | | |
| 1 | 4.83 | | X | X | | X | |
| 2 | 2.74 | X | | X | | X | |
| 3 | 1.76 | X | X | X | | | |
| 4 | 1.23 | X | | X | X | | |
| 5 | 1 | X | X | | X | | |
| 6 | 0.86 | X | | | X | X | |
| 7 | 0.69 | X | | | X | | X |

(X = ENGAGED CLUTCH)

$\frac{\text{RING GEAR}}{\text{SUN GEAR}}$ TOOTH RATIO: $\frac{R_1}{S_1} = 1.75$, $\frac{R_2}{S_2} = 1.50$, $\frac{R_3}{S_3} = 1.80$

| | |
|---|---|
| RATIO SPREAD | 6.98 |
| RATIO STEPS | |
| REV/1 | -0.47 |
| 1/2 | 1.77 |
| 2/3 | 1.56 |
| 3/4 | 1.43 |
| 4/5 | 1.23 |
| 5/6 | 1.16 |
| 6/7 | 1.25 |

| | RATIOS | 150 | 152 | 154 | 156 | 158 | 159 |
|---|---|---|---|---|---|---|---|
| REVERSE | -2.93 | X | | | X | | X |
| NEUTRAL | 0 | X | | | X | | |
| 1 | 5.14 | X | | | X | X | |
| 2 | 3.06 | X | | X | | X | |
| 3 | 1.88 | X | | X | X | | |
| 4 | 1.22 | X | X | X | | | |
| 5 | 1 | | X | X | X | | |
| 6 | 0.88 | | X | X | | X | |
| 7 | 0.74 | | X | X | | | X |

(X = ENGAGED CLUTCH)

$\frac{\text{RING GEAR}}{\text{SUN GEAR}}$ TOOTH RATIO: $\frac{R_1}{S_1} = 2.92$, $\frac{R_2}{S_2} = 1.86$, $\frac{R_3}{S_3} = 1.50$

| | |
|---|---|
| RATIO SPREAD | 6.89 |
| RATIO STEPS | |
| REV/1 | -0.57 |
| 1/2 | 1.68 |
| 2/3 | 1.63 |
| 3/4 | 1.54 |
| 4/5 | 1.22 |
| 5/6 | 1.13 |
| 6/7 | 1.18 |

| | RATIOS | 250 | 252 | 254 | 256 | 258 | 259 |
|---|---|---|---|---|---|---|---|
| REVERSE | -2.72 | | X | X | | | X |
| NEUTRAL | 0 | | X | X | | | |
| 1 | 4.17 | | X | X | | X | |
| 2 | 2.59 | X | | X | | X | |
| 3 | 1.56 | X | X | X | | | |
| 4 | 1 | X | | X | X | | |
| 5 | 0.83 | X | X | | X | | |
| 6 | 0.74 | X | | | X | X | |
| 7 | 0.64 | X | | | X | | X |

(X = ENGAGED CLUTCH)

$\frac{\text{RING GEAR}}{\text{SUN GEAR}}$ TOOTH RATIO: $\frac{R_1}{S_1} = 1.75$, $\frac{R_2}{S_2} = 1.50$, $\frac{R_3}{S_3} = 1.80$

| | |
|---|---|
| RATIO SPREAD | 6.55 |
| RATIO STEPS | |
| REV/1 | -0.65 |
| 1/2 | 1.61 |
| 2/3 | 1.66 |
| 3/4 | 1.56 |
| 4/5 | 1.2 |
| 5/6 | 1.12 |
| 6/7 | 1.16 |

| | RATIOS | 350 | 352 | 354 | 356 | 358 | 359 |
|---|---|---|---|---|---|---|---|
| REVERSE | -2.56 | | X | X | | X | |
| NEUTRAL | 0 | | | X | | X | |
| 1 | 6.04 | | | X | X | X | |
| 2 | 4.02 | | | X | X | | X |
| 3 | 2.25 | | | X | | X | X |
| 4 | 1.67 | X | | X | | | X |
| 5 | 1 | X | | | | X | X |
| 6 | 0.66 | X | X | | | | X |
| 7 | 0.59 | | X | | | X | X |

(X = ENGAGED CLUTCH)

$\frac{\text{RING GEAR}}{\text{SUN GEAR}}$ TOOTH RATIO: $\frac{R_1}{S_1} = 2.57$, $\frac{R_2}{S_2} = 1.51$, $\frac{R_3}{S_3} = 1.50$

| | |
|---|---|
| RATIO SPREAD | 10.27 |
| RATIO STEPS | |
| REV/1 | -0.43 |
| 1/2 | 1.5 |
| 2/3 | 1.79 |
| 3/4 | 1.35 |
| 4/5 | 1.67 |
| 5/6 | 1.5 |
| 6/7 | 1.13 |

| | RATIOS | 450 | 452 | 454 | 456 | 458 | 459 |
|---|---|---|---|---|---|---|---|
| REVERSE | -3 | | X | | | X | X |
| NEUTRAL | 0 | | X | | | | X |
| 1 | 5.06 | | X | | X | | X |
| 2 | 3.6 | X | | | X | | X |
| 3 | 2.51 | X | X | | X | | |
| 4 | 1.6 | X | | | X | X | |
| 5 | 1 | | X | | X | X | |
| 6 | 0.71 | | X | X | X | | |
| 7 | 0.6 | | | X | X | X | |

(X = ENGAGED CLUTCH)

$\frac{\text{RING GEAR}}{\text{SUN GEAR}}$ TOOTH RATIO: $\frac{R_1}{S_1} = 1.51$, $\frac{R_2}{S_2} = 1.50$, $\frac{R_3}{S_3} = 3.00$

| | |
|---|---|
| RATIO SPREAD | 8.41 |
| RATIO STEPS | |
| REV/1 | -0.59 |
| 1/2 | 1.4 |
| 2/3 | 1.43 |
| 3/4 | 1.57 |
| 4/5 | 1.6 |
| 5/6 | 1.4 |
| 6/7 | 1.19 |

| | RATIOS | 550 | 552 | 554 | 556 | 558 | 559 |
|---|---|---|---|---|---|---|---|
| REVERSE | -2.75 | | X | | | X | X |
| NEUTRAL | 0 | | X | | | X | |
| 1 | 6.65 | | X | | X | X | |
| 2 | 4.18 | X | | | X | X | |
| 3 | 2.2 | X | X | | | X | |
| 4 | 1.67 | X | | X | | X | |
| 5 | 1 | X | X | X | | | |
| 6 | 0.66 | X | | X | | | X |
| 7 | 0.59 | X | X | | | | X |

(X = ENGAGED CLUTCH)

$\frac{\text{RING GEAR}}{\text{SUN GEAR}}$ TOOTH RATIO: $\frac{R_1}{S_1} = 2.75$, $\frac{R_2}{S_2} = 1.51$, $\frac{R_3}{S_3} = 1.50$

| RATIO SPREAD | 11.23 |
|---|---|
| RATIO STEPS | |
| REV/1 | -0.41 |
| 1/2 | 1.59 |
| 2/3 | 1.9 |
| 3/4 | 1.32 |
| 4/5 | 1.67 |
| 5/6 | 1.5 |
| 6/7 | 1.12 |

| | RATIOS | 650 | 652 | 654 | 656 | 658 | 659 |
|---|---|---|---|---|---|---|---|
| REVERSE | -6.76 | X | | | | X | X |
| NEUTRAL | 0 | | | X | | | X |
| 1 | 8.56 | | | X | X | | X |
| 2 | 3.75 | X | | X | | | X |
| 3 | 2.62 | | | X | | X | X |
| 4 | 1.59 | | X | X | | | X |
| 5 | 1 | | X | | | X | X |
| 6 | 0.72 | | X | | X | X | |
| 7 | 0.64 | X | X | X | | | |

(X = ENGAGED CLUTCH)

$\frac{\text{RING GEAR}}{\text{SUN GEAR}}$ TOOTH RATIO: $\frac{R_1}{S_1} = 1.75$, $\frac{R_2}{S_2} = 2.26$, $\frac{R_3}{S_3} = 1.63$

| | |
|---|---|
| RATIO SPREAD | 13.45 |
| RATIO STEPS | |
| REV/1 | -0.4 |
| 1/2 | 2.28 |
| 2/3 | 1.43 |
| 3/4 | 1.65 |
| 4/5 | 1.59 |
| 5/6 | 1.4 |
| 6/7 | 1.12 |

| | RATIOS | 750 | 752 | 754 | 756 | 758 | 759 |
|---|---|---|---|---|---|---|---|
| REVERSE | -4.89 | | | X | | X | X |
| NEUTRAL | 0 | X | | X | | | |
| 1 | 2.7 | X | X | X | | | |
| 2 | 1.49 | X | | X | | X | |
| 3 | 1 | X | | X | | | X |
| 4 | 0.68 | X | | X | X | | |
| 5 | 0.56 | | | X | X | | X |
| 6 | 0.46 | | X | X | X | | |
| 7 | 0.41 | | | X | X | X | |
| 8 | 0.25 | | X | | | X | X |
| 9 | 0.17 | | X | | X | | X |

(X = ENGAGED CLUTCH)

$\frac{\text{RING GEAR}}{\text{SUN GEAR}}$ TOOTH RATIO: $\frac{R_1}{S_1} = 1.50$, $\frac{R_2}{S_2} = 2.96$, $\frac{R_3}{S_3} = 2.15$

| RATIO SPREAD | 15.89 |
|---|---|
| RATIO STEPS | |
| REV/1 | -1.81 |
| 1/2 | 1.81 |
| 2/3 | 1.49 |
| 3/4 | 1.46 |
| 4/5 | 1.21 |
| 5/6 | 1.24 |
| 6/7 | 1.12 |
| 7/8 | 1.64 |
| 8/9 | 1.47 |

| | RATIOS | 850 | 852 | 854 | 856 | 858 | 859 |
|---|---|---|---|---|---|---|---|
| REVERSE | -4.34 | X | | | X | | X |
| NEUTRAL | 0 | X | | | X | | |
| 1 | 6.29 | X | | X | | | X |
| 2 | 4.09 | X | | X | | X | |
| 3 | 2.28 | X | | X | X | | |
| 4 | 1.49 | X | X | X | | | |
| 5 | 1 | | X | X | X | | |
| 6 | 0.79 | | X | X | | X | |
| 7 | 0.72 | | X | X | | | X |

(X = ENGAGED CLUTCH)

$\frac{\text{RING GEAR}}{\text{SUN GEAR}}$ TOOTH RATIO: $\frac{R_1}{S_1} = 1.63$, $\frac{R_2}{S_2} = 1.86$, $\frac{R_3}{S_3} = 1.75$

| | |
|---|---|
| RATIO SPREAD | 8.73 |
| RATIO STEPS | |
| REV/1 | -0.69 |
| 1/2 | 1.54 |
| 2/3 | 1.79 |
| 3/4 | 1.54 |
| 4/5 | 1.49 |
| 5/6 | 1.27 |
| 6/7 | 1.09 |

| | RATIOS | 950 | 952 | 954 | 956 | 958 | 959 |
|---|---|---|---|---|---|---|---|
| REVERSE | -2 | | X | X | | X | |
| NEUTRAL | 0 | X | | | X | | |
| 1 | 4.49 | | X | X | | | X |
| 2 | 2.49 | X | | X | | | X |
| 3 | 1.6 | X | X | X | | | |
| 4 | 1.2 | X | | X | X | | |
| 5 | 1 | X | X | | X | | |
| 6 | 0.85 | X | | | X | | X |
| 7 | 0.67 | X | | | X | X | |

(X = ENGAGED CLUTCH)

$\frac{\text{RING GEAR}}{\text{SUN GEAR}}$ TOOTH RATIO: $\frac{R_1}{S_1} = 2.00$, $\frac{R_2}{S_2} = 2.99$, $\frac{R_3}{S_3} = 1.80$

| RATIO SPREAD | 6.73 |
|---|---|
| RATIO STEPS | |
| REV/1 | -0.45 |
| 1/2 | 1.8 |
| 2/3 | 1.56 |
| 3/4 | 1.33 |
| 4/5 | 1.2 |
| 5/6 | 1.18 |
| 6/7 | 1.27 |

| | RATIOS | 1050 | 1052 | 1054 | 1056 | 1058 | 1059 |
|---|---|---|---|---|---|---|---|
| REVERSE | -6.76 | X | | | | X | X |
| NEUTRAL | 0 | | | X | | | X |
| 1 | 4.75 | | | X | X | | X |
| 2 | 2.36 | X | | X | | | X |
| 3 | 1.58 | | | X | | X | X |
| 4 | 1.21 | | X | X | | | X |
| 5 | 1 | | X | | | X | X |
| 6 | 0.72 | | X | | X | X | |
| 7 | 0.64 | X | X | | | X | |

(X = ENGAGED CLUTCH)

$\frac{\text{RING GEAR}}{\text{SUN GEAR}}$ TOOTH RATIO: $\frac{R_1}{S_1} = 1.75$, $\frac{R_2}{S_2} = 2.01$, $\frac{R_3}{S_3} = 1.74$

| | |
|---|---|
| RATIO SPREAD | 7.47 |
| RATIO STEPS | |
| REV/1 | -1.42 |
| 1/2 | 2.01 |
| 2/3 | 1.5 |
| 3/4 | 1.30 |
| 4/5 | 1.21 |
| 5/6 | 1.38 |
| 6/7 | 1.41 |

| | RATIOS | 1150 | 1152 | 1154 | 1156 | 1158 | 1159 |
|---|---|---|---|---|---|---|---|
| REVERSE | -2.03 | X | | X | | X | |
| NEUTRAL | 0 | X | | | X | | |
| 1 | 3.53 | X | | | X | | X |
| 2 | 1.99 | X | | X | X | | |
| 3 | 1.33 | X | | | X | X | |
| 4 | 1 | | X | | X | X | |
| 5 | 0.73 | X | X | | | X | |
| 6 | 0.48 | X | X | | | | X |
| 7 | 0.35 | X | X | X | | | |

(X = ENGAGED CLUTCH)

$\frac{\text{RING GEAR}}{\text{SUN GEAR}}$ TOOTH RATIO: $\frac{R_1}{S_1} = 1.5$, $\frac{R_2}{S_2} = 1.66$, $\frac{R_3}{S_3} = 3.02$

| | |
|---|---|
| RATIO SPREAD | 8.85 |
| RATIO STEPS | |
| REV/1 | -0.57 |
| 1/2 | 1.77 |
| 2/3 | 1.5 |
| 3/4 | 1.33 |
| 4/5 | 1.37 |
| 5/6 | 1.51 |
| 6/7 | 1.2 |

| | RATIOS | 1250 | 1252 | 1254 | 1256 | 1258 | 1259 |
|---|---|---|---|---|---|---|---|
| REVERSE | -6.91 | | X | X | | X | |
| NEUTRAL | 0 | | | X | | | X |
| 1 | 4.79 | | | X | X | | X |
| 2 | 2.38 | | X | X | | | X |
| 3 | 1.6 | | | X | | X | X |
| 4 | 1 | X | | X | | | X |
| 5 | 0.82 | X | | | | X | X |
| 6 | 0.69 | X | | | X | | X |
| 7 | 0.64 | X | X | | | | X |

(X = ENGAGED CLUTCH)

$\frac{\text{RING GEAR}}{\text{SUN GEAR}}$ TOOTH RATIO: $\frac{R_1}{S_1} = 1.75$, $\frac{R_2}{S_2} = 1.67$, $\frac{R_3}{S_3} = 2.00$

| | |
|---|---|
| RATIO SPREAD | 7.54 |
| RATIO STEPS | |
| REV/1 | -1.44 |
| 1/2 | 2.01 |
| 2/3 | 1.49 |
| 3/4 | 1.60 |
| 4/5 | 1.21 |
| 5/6 | 1.2 |
| 6/7 | 1.08 |

| | RATIOS | 1350 | 1352 | 1354 | 1356 | 1358 | 1359 |
|---|---|---|---|---|---|---|---|
| REVERSE | -2.15 | | X | | X | X | |
| NEUTRAL | 0 | | | X | X | | |
| 1 | 3.51 | | | X | X | | X |
| 2 | 1.98 | | X | X | X | | |
| 3 | 1.33 | | | X | X | X | |
| 4 | 1 | X | | X | | X | |
| 5 | 0.72 | X | | | X | X | |
| 6 | 0.48 | X | | | X | | X |
| 7 | 0.4 | X | X | | X | | |

(X = ENGAGED CLUTCH)

$\frac{\text{RING GEAR}}{\text{SUN GEAR}}$ TOOTH RATIO: $\frac{R_1}{S_1} = 2.51$, $\frac{R_2}{S_2} = 2.99$, $\frac{R_3}{S_3} = 1.63$

| RATIO SPREAD | 8.81 |
|---|---|
| RATIO STEPS | |
| REV/1 | -0.61 |
| 1/2 | 1.77 |
| 2/3 | 1.48 |
| 3/4 | 1.33 |
| 4/5 | 1.37 |
| 5/6 | 1.51 |
| 6/7 | 1.21 |

| | RATIOS | 1450 | 1452 | 1454 | 1456 | 1458 | 1459 |
|---|---|---|---|---|---|---|---|
| REVERSE | -3.18 | X | | X | | | X |
| NEUTRAL | 0 | | | | X | | X |
| 1 | 2.65 | | X | | X | | X |
| 2 | 1.46 | | | X | X | | X |
| 3 | 1 | X | | | X | | X |
| 4 | 0.77 | | | X | X | X | |
| 5 | 0.6 | X | | X | | X | |
| 6 | 0.41 | | X | X | | X | |
| 7 | 0.35 | | | X | | X | X |

(X = ENGAGED CLUTCH)

$\frac{\text{RING GEAR}}{\text{SUN GEAR}}$ TOOTH RATIO: $\frac{R_1}{S_1} = 1.86$, $\frac{R_2}{S_2} = 1.65$, $\frac{R_3}{S_3} = 1.80$

| RATIO SPREAD | 7.6 |
|---|---|
| RATIO STEPS | |
| REV/1 | -1.2 |
| 1/2 | 1.82 |
| 2/3 | 1.46 |
| 3/4 | 1.30 |
| 4/5 | 1.28 |
| 5/6 | 1.45 |
| 6/7 | 1.19 |

TRANSMISSION MECHANISMS WITH THREE PLANETARY GEAR SETS AND A STATIONARY FIXED INTERCONNECTION

TECHNICAL FIELD

The present invention relates to a family of power transmissions having three planetary gear sets that are controlled by six torque-transmitting devices to provide at least seven forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four and five-speed transmissions, including improved vehicle acceleration and improved fuel economy. While many trucks employ power transmissions, such as Polak, having six or more forward speed ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

Seven-speed transmissions are disclosed in U.S. Pat. No. 4,709,594 to Maeda; U.S. Pat. No. 6,053,839 to Baldwin et. al.; and U.S. Pat. No. 6,083,135 to Baldwin et. al. Seven- and eight-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

It is an object of the present invention to provide an improved family of transmissions having three planetary gear sets controlled to provide at least seven forward speed ratios and one reverse speed ratio.

In one aspect of the present invention, the family of transmissions has three planetary gear sets, each of which includes a first, second and third member, which members may comprise a sun gear, a ring gear, or a planet carrier assembly member.

In referring to the first, second and third gear sets in this description and in the claims, these sets may be counted "first" to "third" in any order in the drawings (i.e., left to right, right to left, etc.).

In another aspect of the present invention, each of the planetary gear sets may be of the single pinion-type or of the double pinion-type.

In yet another aspect of the present invention, the first member of the first planetary gear set is continuously interconnected to the first member of the second planetary gear set and to a transmission housing through an interconnecting member.

In yet a further aspect of the invention, each family member incorporates an output shaft which is continuously connected with a member of the planetary gear sets and an input shaft which is continuously connected with another member of the planetary gear sets.

In a further aspect of the invention, a first torque-transmitting mechanism, such as a clutch, selectively interconnects a member of the first planetary gear set with the input shaft, the output shaft, or a member of the second or third planetary gear set.

In still a further aspect of the invention, a second torque-transmitting mechanism, such as a clutch, selectively interconnects a member of the second planetary gear set with the input shaft, the output shaft, or a member of the first or third planetary gear set.

In another aspect of the invention, a third torque-transmitting mechanism, such as a clutch, selectively interconnects a member of the third planetary gear set with a member of the first or second planetary gear set.

In a still further aspect of the invention, a fourth torque-transmitting mechanism, such as a clutch, selectively interconnects a member of the first or second planetary gear set with another member of the first, second or third planetary gear set.

In a still further aspect of the invention, a fifth torque-transmitting mechanism, such as a clutch, selectively interconnects a member of the second or third planetary gear set with another member of the first, second or third planetary gear set.

In still another aspect of the invention, a sixth torque-transmitting mechanism, such as a clutch, selectively interconnects a member of the first, second or third planetary gear set with another member of the first, second or third planetary gear set. Alternatively, the sixth torque transmitting mechanism, such as a brake, selectively connects a member of the first, second or third planetary gear set with the transmission housing.

In still another aspect of the invention, the six torque-transmitting mechanisms are selectively engageable in combinations of three to yield at least seven forward speed ratios and one reverse speed ratio.

The above object and other objects, features, and advantages of the present invention are readily apparent from the following detailed description of the best modes for carrying out the invention when taken in connection with the accompanying drawings.

DESCRIPTION OF THE PREFERRED EMBODIMENT

Figures 1A, 1B:
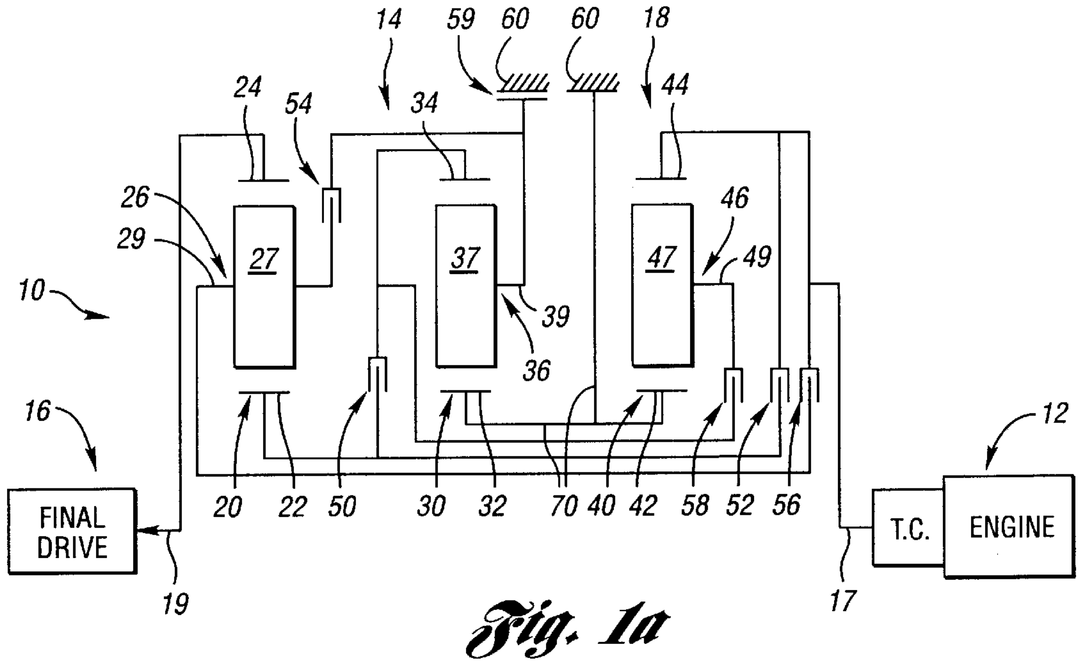
FIG. 1*a* is a schematic representation of a powertrain including a planetary transmission incorporating a family member of the present invention.
FIG. 1*b* is a truth table and chart depicting some of the operating characteristics of the powertrain shown in FIG. 1*a;*

Referring to the drawings, wherein like characters represent the same or corresponding parts throughout the several views, there is shown in FIG. 1*a* a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement also includes six torque-transmitting mechanisms 50, 52, 54, 56, 58 and 59. The torque-transmitting mechanisms 50, 52, 54, 56 and 58 are rotating-type torque-transmitting mechanisms, commonly termed clutches. The torque-transmitting mechanism 59 is a stationary-type torque-transmitting mechanism, commonly termed brake or reaction clutch.

The input shaft 17 is continuously connected with the ring gear member 44, and the output shaft 19 is continuously connected with the ring gear member 24. The sun gear member 32 is continuously connected with the sun gear member 42 and with the transmission housing 60 through the interconnecting member 70.

The sun gear member 22 is selectively connectable with the ring gear member 34 through the clutch 50. The sun gear member 22 is selectively connectable with the ring gear member 44 through the clutch 52. The planet carrier assembly member 26 is selectively connectable with the planet carrier assembly member 36 through the clutch 54. The planet carrier assembly member 26 is selectively connectable with the ring gear member 44 through the clutch 56. The ring gear member 34 is selectively connectable with the planet carrier assembly member 46 through the clutch 58. The planet carrier assembly member 36 is selectively connectable with the transmission housing 60 through the brake 59.

As shown in FIG. 1*b*, and in particular the truth table disclosed therein, the torque-transmitting mechanisms are selectively engaged in combinations of three to provide seven forward speed ratios and a reverse speed ratio. It should also be noted in the truth table that the torque-transmitting mechanisms 52 and 54 remain engaged through a neutral condition, thereby simplifying the forward/reverse interchange.

The reverse speed ratio is established with the engagement of the clutches 52, 54 and the brake 59. The clutch 52 connects the sun gear member 22 to the ring gear member 44. The clutch 54 connects the planet carrier assembly member 26 to the planet carrier assembly member 36. The brake 59 connects the planet carrier assembly member 36 to the transmission housing 60. The ring gear member 24 rotates at the same speed as the output shaft 19. The sun gear member 22 and ring gear member 44 rotate at the same speed as the input shaft 17. The planet carrier assembly member 26, planetary gear set 30, and sun gear member 42 do not rotate. The ring gear member 24, and therefore the output shaft 19, rotates at a speed determined from the speed of the sun gear member 22 and the ring gear/sun gear tooth ratio of the planetary gear set 20. The numerical value of the reverse speed ratio is determined utilizing the ring gear/sun gear tooth ratio of the planetary gear set 20.

The first forward speed ratio is established with the engagement of the clutches 52, 54 and 58. The clutch 52 connects the sun gear member 22 to the ring gear member 44. The clutch 54 connects the planet carrier assembly member 26 to the planet carrier assembly member 36. The clutch 58 connects the ring gear member 34 to the planet carrier assembly member 46. The ring gear member 24 rotates at the same speed as the output shaft 19. The planet carrier assembly member 26 rotates at the same speed as the planet carrier assembly member 36. The sun gear member 22 and ring gear member 44 rotate at the same speed as the input shaft 17. The ring gear member 24, and therefore the output shaft 19, rotates at a speed determined from the speed of the planet carrier assembly member 26, the speed of the sun gear member 22, and the ring gear/sun gear tooth ratio of the planetary gear set 20. The sun gear members 32, 42 do not rotate. The ring gear member 34 rotates at the same speed as the planet carrier assembly member 46. The planet carrier assembly member 36 rotates at a speed determined from the speed of the ring gear member 34, and the ring gear/sun gear tooth ratio of the planetary gear set 30. The planet carrier assembly member 46 rotates at the speed determined from the speed of the ring gear member 44, and the ring gear/sun gear tooth ratio of the planetary gear set 40. The numerical value of the first forward speed ratio is determined utilizing the ring gear/sun gear tooth ratios of the planetary gear sets 20, 30 and 40.

The second forward speed ratio is established with the engagement of the clutches 50, 54 and 58. The clutch 50 connects the sun gear member 22 to the ring gear member 34. The clutch 54 connects the planet carrier assembly member 26 to the planet carrier assembly member 36. The clutch 58 connects the ring gear member 34 to the planet carrier assembly member 46. The ring gear member 24 rotates at the same speed as the output shaft 19. The planet carrier assembly member 26 rotates at the same speed as the planet carrier assembly member 36. The sun gear member 22 rotates at the same speed as the ring gear member 34 and the planet carrier assembly member 46. The ring gear member 24, and therefore the output shaft 19, rotates at a speed determined from the speed of the planet carrier assembly member 26, the speed of the sun gear member 22, and the ring gear/sun gear tooth ratio of the planetary gear set 20. The sun gear members 32, 42 do not rotate. The planet carrier assembly member 36 rotates at a speed determined from the speed of the ring gear member 34 and the ring gear/sun gear tooth ratio of the planetary gear set 30. The ring gear member 44 rotates at the same speed as the input shaft 17. The planet carrier assembly member 46 rotates at a speed determined from the speed of the ring gear member 44 and the ring gear/sun gear tooth ratio of the planetary gear set 40. The numerical value of the second forward speed ratio is determined utilizing the ring gear/sun gear tooth ratios of the planetary gear sets 20, 30 and 40.

The third forward speed ratio is established with the engagement of the clutches 50, 52 and 54. The clutch 50 connects the sun gear member 22 to the ring gear member 34. The clutch 52 connects the sun gear member 22 to the ring gear member 44. The clutch 54 connects the planet carrier assembly member 26 to the planet carrier assembly member 36. The ring gear member 24 rotates at the same speed as the output shaft 19. The planet carrier assembly member 26 rotates at the same speed as the planet carrier assembly member 36. The sun gear member 22 rotates at the same speed as the ring gear member 34, the ring gear member 44, and the input shaft 17. The ring gear member 24, and therefore the output shaft 19, rotates at a speed determined from the speed of the planet carrier assembly member 26, the speed of the sun gear member 22, and the ring gear/sun gear tooth ratio of the planetary gear set 20. The sun gear members 32, 42 do not rotate. The planet carrier assembly member 36 rotates at a speed determined from the speed of the ring gear member 34 and the ring gear/sun gear tooth ratio of the planetary gear set 30. The numerical value of the third forward speed ratio is determined utilizing the ring gear/sun gear tooth ratios of the planetary gear sets 20 and 30.

The fourth forward speed ratio is established with the engagement of the clutches 50, 54 and 56. The clutch 50 connects the sun gear member 22 to the ring gear member 34. The clutch 54 connects the planet carrier assembly member 26 to the planet carrier assembly member 36. The clutch 56 connects the planet carrier assembly member 26 to the ring gear member 44. The ring gear member 24 rotates at the same speed as the output shaft 19. The planet carrier assembly members 26, 36 and the ring gear member 44 rotate at the same speed as the input shaft 17. The sun gear member 22 rotates at the same speed as the ring gear member 34. The ring gear member 24, and therefore the output shaft 19, rotates at a speed determined from the speed of the planet carrier assembly member 26, the speed of the sun gear member 22, and the ring gear/sun gear tooth ratio of the planetary gear set 20. The sun gear members 32, 42 do not rotate. The planet carrier assembly member 36 rotates at a speed determined from the speed of the ring gear member 34 and the ring gear/sun gear tooth ratio of the planetary gear set 30.

The fifth forward speed ratio is established with the engagement of the clutches 50, 52 and 56. In this configuration, the input shaft 17 is directly connected to the output shaft 19. The numerical value of the fifth forward speed ratio is 1.

The sixth forward speed ratio is established with the engagement of the clutches 50, 56 and 58. The clutch 50 connects the sun gear member 22 to the ring gear member 34. The clutch 56 connects the planet carrier assembly member 26 to the ring gear member 44. The clutch 58 connects the ring gear member 34 to the planet carrier assembly member 46. The ring gear member 24 rotates at the same speed as the output shaft 19. The planet carrier assembly member 26 and ring gear member 44 rotate at the same speed as the input shaft 17. The sun gear member 22 and the ring gear member 34 rotate at the same speed as the planet carrier assembly member 46. The ring gear member 24, and therefore the output shaft 19, rotates at a speed determined from the speed of the planet carrier assembly member 26, the speed of the sun gear member 22, and the ring gear/sun gear tooth ratio of the planetary gear set 20. The sun gear members 32, 42 do not rotate. The planet carrier assembly member 36 rotates at a speed determined from the speed of the ring gear member 34 and the ring gear/sun gear tooth ratio of the planetary gear set 30. The planet carrier assembly member 46 rotates at a speed determined from the speed of the ring gear member 44 and the ring gear/sun gear tooth ratio of the planetary gear set 40. The numerical value of the sixth forward speed ratio is determined utilizing the ring gear/sun gear tooth ratios of the planetary gear sets 20, 30 and 40.

The seventh forward speed ratio is established with the engagement of the clutches 50, 56 and the brake 59. The clutch 50 connects the sun gear member 22 to the ring gear member 34. The clutch 56 connects the planet carrier assembly member 26 to the ring gear member 44. The brake 59 connects the planet carrier assembly member 36 to the transmission housing 60. The ring gear member 24 rotates at the same speed as the output shaft 17. The planet carrier assembly member 26 and ring gear member 44 rotate at the same speed as the input shaft 17. The sun gear members 22, 42 and the planetary gear set 30 do not rotate. The ring gear member 24, and therefore the output shaft 19, rotates at a speed determined from the speed of the planet carrier assembly member 26, and the ring gear/sun gear tooth ratio of the planetary gear set 20. The numerical value of the seventh forward speed ratio is determined utilizing the ring gear/sun gear tooth ratio of the planetary gear set 20.

As set forth above, the engagement schedule for the torque-transmitting mechanisms is shown in the truth table of FIG. 1*b*. This truth table also provides an example of speed ratios that are available utilizing the ring gear/sun gear tooth ratios given by way of example in FIG. 1*b*. The R1/S1 value is the tooth ratio of the planetary gear set 20; the R2/S2 value is the tooth ratio of the planetary gear set 30; and the R3/S3 value is the tooth ratio of the planetary gear set 40. Also, the chart of FIG. 1*b* describes the ratio steps that are attained utilizing the sample of tooth ratios given. For example, the step ratio between the first and second forward speed ratios is 1.77, while the step ratio between the reverse and first forward ratio is −0.47. It can also be readily determined from the truth table of FIG. 1*b* that all of the single step forward ratio interchanges are of the single transition variety, as are the double step forward ratio interchanges.

Figures 2A, 2B:
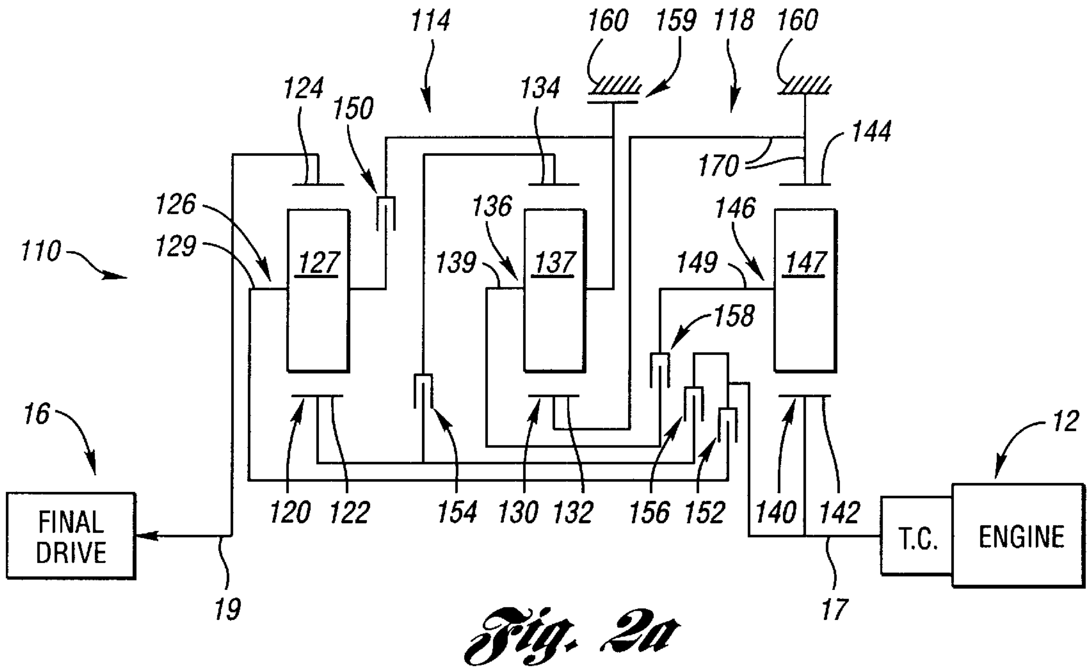
FIG. 2*a* is a schematic representation of a powertrain having a planetary transmission incorporating another family member of the present invention.
FIG. 2*b* is a truth table and chart depicting some of the operating characteristics of the powertrain shown in FIG. 2*a;*

FIG. 2*a* shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes six torque-transmitting mechanisms 150, 152, 154, 156, 158 and 159. The torque-transmitting mechanisms 150, 152, 154, 156 and 158 are rotating-type torque-transmitting mechanisms, commonly termed "clutches." The torque-transmitting mechanism 159 is a stationary-type torque-transmitting mechanism, commonly termed brake or reaction clutch.

The input shaft 17 is continuously connected with the sun gear member 142, and the output shaft 19 is continuously connected with the ring gear member 124. The sun gear member 132 is continuously connected with the ring gear member 144 and with the transmission housing 160 through the interconnecting member 170.

The planet carrier assembly member 126 is selectively connectable with the planet carrier assembly member 136 through the clutch 150. The planet carrier assembly member

126 is selectively connectable with the sun gear member 142 through the clutch 152. The sun gear member 122 is selectively connectable with the ring gear member 134 through the clutch 154. The sun gear member 122 is selectively connectable with the sun gear member 142 through the clutch 156. The planet carrier assembly member 136 is selectively connectable with the planet carrier assembly member 146 through the clutch 158. The planet carrier assembly member 136 is selectively connectable with the transmission housing 160 through the brake 159.

The truth table of FIG. 2*b* describes the engagement sequence utilized to provide seven forward speed ratios and a reverse speed ratio in the planetary gear arrangement 118 shown in FIG. 2*a*.

The reverse speed ratio is established with the engagement of the clutches 150, 156 and the brake 159. The clutch 150 connects the planet carrier assembly member 126 to the planet carrier assembly member 136. The clutch 156 connects the sun gear member 122 to the sun gear member 142. The brake 159 connects the planet carrier assembly member 136 to the transmission housing 160. The ring gear member 124 rotates at the same speed as the output shaft 19. The planet carrier assembly member 126, planetary gear set 130, and ring gear member 144 do not rotate. The sun gear member 122 and sun gear member 142 rotate at the same speed as the input shaft 17. The ring gear member 124, and therefore the output shaft 19, rotates at a speed determined from the speed of the sun gear member 122 and the ring gear/sun gear tooth ratio of the planetary gear set 120. The numerical value of the reverse speed ratio is determined utilizing the ring gear/sun gear tooth ratio of the planetary gear set 120.

The first forward speed ratio is established with the engagement of the clutches 150, 156 and 158. The clutch 150 connects the planet carrier assembly member 126 to the planet carrier assembly member 136. The clutch 156 connects the sun gear member 122 to the sun gear member 142. The clutch 158 connects the planet carrier assembly member 136 to the planet carrier assembly member 146. The ring gear member 124 rotates at the same speed as the output shaft 19. The planet carrier assembly members 126, 136 and 146 all rotate at the same speed. The sun gear members 122, 142 rotate at the same speed as the input shaft 17. The ring gear member 124, and therefore the output shaft 19, rotates at a speed determined from the speed of the planet carrier assembly member 126, the speed of the sun gear member 122, and the ring gear/sun gear tooth ratio of the planetary gear set 120. The sun gear member 132 and ring gear member 144 do not rotate. The planet carrier assembly member 146 rotates at a speed determined from the speed of the sun gear member 142 and the ring gear/sun gear tooth ratio of the planetary gear set 140. The numerical value of the first forward speed ratio is determined utilizing the ring gear/sun gear tooth ratios of the planetary gear sets 120 and 140.

The second forward speed ratio is established with the engagement of the clutches 150, 154 and 158. The clutch 150 connects the planet carrier assembly member 126 to the planet carrier assembly member 136. The clutch 154 connects the sun gear member 122 to the ring gear member 134. The clutch 158 connects the planet carrier assembly member 136 to the planet carrier assembly member 146. The ring gear member 124 rotates at the same speed as the output shaft 19. The planet carrier assembly members 126, 136 and 146 all rotate at the same speed. The sun gear member 122 rotates at the same speed as the ring gear member 134. The ring gear member 124, and therefore the output shaft 19, rotates at a speed determined from the speed of the planet carrier assembly member 126, the speed of the sun gear member 122, and the ring gear/sun gear tooth ratio of the planetary gear set 120. The sun gear member 132 and ring gear member 144 do not rotate. The planet carrier assembly member 136 rotates at a speed determined from the speed of the ring gear member 134 and the ring gear/sun gear tooth ratio of the planetary gear set 130. The sun gear member 142 rotates at the same speed as the input shaft 17. The planet carrier assembly member 146 rotates at a speed determined from the speed of the sun gear member 142 and the ring gear/sun gear tooth ratio of the planetary gear set 140. The numerical value of the second forward speed ratio is determined utilizing the ring gear/sun gear tooth ratios of the planetary gear sets 120, 130 and 140.

The third forward speed ratio is established with the engagement of the clutches 150, 154 and 156. The clutch 150 connects the planet carrier assembly member 126 to the planet carrier assembly member 136. The clutch 154 connects the sun gear member 122 to the ring gear member 134. The clutch 156 connects the sun gear member 122 to the sun gear member 142. The ring gear member 124 rotates at the same speed as the output shaft 19. The planet carrier assembly member 126 rotates at the same speed as the planet carrier assembly member 136. The sun gear members 122, 142 and ring gear member 134 rotate at the same speed as the input shaft 17. The ring gear member 124, and therefore the output shaft 19, rotates at a speed determined from the speed of the planet carrier assembly member 126, the speed of the sun gear member 122, and the ring gear/sun gear tooth ratio of the planetary gear set 120. The sun gear member 132 and ring gear member 144 do not rotate. The planet carrier assembly member 136 rotates at a speed determined from the speed of the ring gear member 134 and the ring gear/sun gear tooth ratio of the planetary gear set 130. The numerical value of the third forward speed ratio is determined utilizing the ring gear/sun gear tooth ratios of the planetary gear sets 120 and 130.

The fourth forward speed ratio is established with the engagement of the clutches 150, 152 and 154. The clutch 150 connects the planet carrier assembly member 126 to the planet carrier assembly member 136. The clutch 152 connects the planet carrier assembly member 126 to the sun gear member 142. The clutch 154 connects the sun gear member 122 to the ring gear member 134. The ring gear member 124 rotates at the same speed as the output shaft 19. The planet carrier assembly members 126, 136 and sun gear member 142 rotate at the same speed as the input shaft 17. The sun gear member 122 rotates at the same speed as the ring gear member 134. The ring gear member 124, and therefore the output shaft 19, rotates at a speed determined from the speed of the planet carrier assembly member 126, the speed of the sun gear member 122, and the ring gear/sun gear tooth ratio of the planetary gear set 120. The sun gear member 132 and ring gear member 144 do not rotate. The planet carrier assembly member 136 rotates at a speed determined from the speed of the ring gear member 134 and the ring gear/sun gear tooth ratio of the planetary gear set 130. The numerical value of the fourth forward speed ratio is determined utilizing the ring gear/sun gear tooth ratios of the planetary gear sets 120 and 130.

The fifth forward speed ratio is established with the engagement of the clutches 152, 154 and 156. In this configuration, the input shaft 17 is directly connected to the output shaft 19. The numerical value of the fifth forward speed ratio is 1.

The sixth forward speed ratio is established with the engagement of the clutches 152, 154 and 158. The clutch 152 connects the planet carrier assembly member 126 to the sun gear member 142. The clutch 154 connects the sun gear member 122 to the ring gear member 134. The clutch 158 connects the planet carrier assembly member 136 to the planet carrier assembly member 146. The ring gear member 124 rotates at the same speed as the output shaft 19. The planet carrier assembly member 126 and sun gear member 142 rotate at the same speed as the input shaft 17. The sun gear member 122 rotates at the same speed as the ring gear member 134. The ring gear member 124, and therefore the output shaft 19, rotates at a speed determined from the speed of the planet carrier assembly member 126, the speed of the sun gear member 122, and the ring gear/sun gear tooth ratio of the planetary gear set 120. The planet carrier assembly member 136 rotates at the same speed as the planet carrier assembly member 146. The sun gear member 132 and ring gear member 144 do not rotate. The planet carrier assembly member 136 rotates at a speed determined from the speed of the ring gear member 134, and the ring gear/sun gear tooth ratio of the planetary gear set 130. The planet carrier assembly member 146 rotates at a speed determined from the speed of the sun gear member 142, and the ring gear/sun gear tooth ratio of the planetary gear set 140. The numerical value of the sixth forward speed ratio is determined utilizing the ring gear/sun gear tooth ratios of the planetary gear sets 120, 130 and 140.

The seventh forward speed ratio is established with the engagement of the clutches 152, 154 and the brake 159. The clutch 152 connects the planet carrier assembly member 126 to the sun gear member 142. The clutch 154 connects the sun gear member 122 to the ring gear member 134. The brake 159 connects the planet carrier assembly member 136 to the transmission housing 160. The ring gear member 124 rotates at the same speed and the output shaft 19. The planet carrier assembly member 126 and sun gear member 142 rotate at the same speed as the input shaft 17. The sun gear member 122, planetary gear set 130, and ring gear member 144 do not rotate. The ring gear member 124, and therefore the output shaft 19, rotates at a speed determined from the speed of the planet carrier assembly member 126, and the ring gear/sun gear tooth ratio of the planetary gear set 120. The numerical value of the seventh forward speed ratio is determined utilizing the ring gear/sun gear tooth ratio of the planetary gear set 120.

As set forth above, the truth table of FIG. 2*b* describes the engagement sequence of the torque-transmitting mechanisms utilized to provide a reverse drive ratio and seven forward speed ratios. It can be readily determined from the truth table that all of the single step forward interchanges are of the single transition type, as are the double step forward interchanges. The truth table also provides an example of the ratios that can be attained with the family members shown in FIG. 2*a* utilizing the sample tooth ratios given in FIG. 2*b*. The R1/S1 value is the tooth ratio of the planetary gear set 120; the R2/S2 value is the tooth ratio of the planetary gear set 130; and the R3/S3 value is the tooth ratio of the planetary gear set 140. Also shown in FIG. 2*b* are the ratio steps between single step ratios in the forward direction as well as the reverse to first ratio step ratio. For example, the first to second step ratio is 1.68.

Figures 3A, 3B:
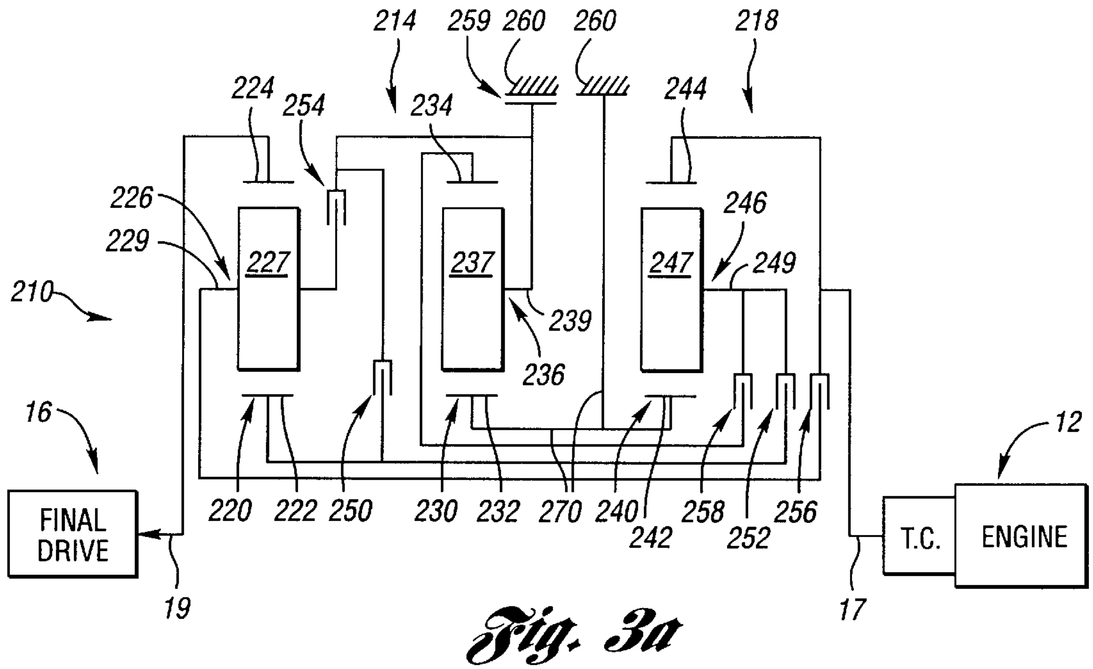
FIG. 3*a* is a schematic representation of a powertrain having a planetary transmission incorporating another family member of the present invention.
FIG. 3*b* is a truth table and chart depicting some of the operating characteristics of the powertrain shown in FIG. 3*a;*

Turning to FIG. 3*a*, a powertrain 210 includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes six torque-transmitting mechanisms 250, 252, 254, 256, 258 and 259. The torque-transmitting mechanisms 250, 252, 254, 256 and 258 are rotating type torque-transmitting mechanisms, commonly termed clutches. The torque-transmitting mechanism 259 is a stationary type torque-transmitting mechanism, commonly termed brake or reaction clutch.

The input shaft 17 is continuously connected with the ring gear member 244, and the output shaft 19 is continuously connected with the ring gear member 224. The sun gear member 232 is continuously connected with the sun gear member 242 and with the transmission housing 260 through the interconnecting member 270.

The sun gear member 222 is selectively connectable with the planet carrier assembly member 236 through the clutch 250. The sun gear member 222 is selectively connectable with the planet carrier assembly member 246 through the clutch 252. The planet carrier assembly member 226 is selectively connectable with the planet carrier assembly member 236 through the clutch 254. The planet carrier assembly member 226 is selectively connectable with the ring gear member 244 through the clutch 256. The ring gear member 234 is selectively connectable with the planet carrier assembly member 246 through the clutch 258. The planet carrier assembly member 236 is selectively connectable with the transmission housing 260 through the brake 259.

As shown in the truth table in FIG. 3*b*, the torque-transmitting mechanisms are engaged in combinations of three to establish seven forward speed ratios and one reverse ratio.

The reverse speed ratio is established with the engagement of the clutches 252, 254 and the brake 259. The clutch 252 connects the sun gear member 222 to the planet carrier assembly member 246. The clutch 254 connects the planet carrier assembly member 226 to the planet carrier assembly member 236. The brake 259 connects the planet carrier assembly member 236 to the transmission housing 260. The ring gear member 224 rotates at the same speed as the output shaft 19. The planet carrier assembly member 226, planetary gear set 230, and sun gear member 242 do not rotate. The sun gear member 222 rotates at the same speed as the planet carrier assembly member 246. The ring gear member 224, and therefore the output shaft 19, rotates at a speed determined from the speed of the sun gear member 222 and the ring gear/sun gear tooth ratio of the planetary gear set 220. The ring gear member 244 rotates at the same speed as the input shaft 17. The planet carrier assembly member 226 rotates at a speed determined from the speed of the ring gear member 244 and the ring gear/sun gear tooth ratio of the planetary gear set 240. The numerical value of the reverse speed ratio is determined utilizing the ring gear/sun gear tooth ratios of the planetary gear sets 220 and 240.

The first forward speed ratio is established with the engagement of the clutches 252, 254 and 258. The clutch 252 connects the sun gear member 222 to the planet carrier assembly member 246. The clutch 254 connects the planet carrier assembly member 226 to the planet carrier assembly member 236. The clutch 258 connects the ring gear member 234 to the planet carrier assembly member 246. The ring gear member 224 rotates at the same speed as the output shaft 19. The planet carrier assembly member 226 rotates at the same speed as the planet carrier assembly member 236. The sun gear member 222 rotates at the same speed as the planet carrier assembly member 246 and the ring gear member 234. The ring gear member 224, and therefore the output shaft 19, rotates at a speed determined from the speed of the planet carrier assembly member 226, the speed of the sun gear member 222, and the ring gear/sun gear tooth ratio of the planetary gear set 220. The sun gear members 232, 242 do not rotate. The planet carrier assembly member 236 rotates at a speed determined from the speed of the ring gear member 234 and the ring gear/sun gear tooth ratio of the planetary gear set 230. The ring gear member 244 rotates at the same speed as the input shaft 17. The planet carrier assembly member 246 rotates at a speed determined from the speed of the ring gear member 244 and the ring gear/sun gear tooth ratio of the planetary gear set 240. The numerical value of the first forward speed ratio is determined utilizing the ring gear/sun gear tooth ratios of the planetary gear sets 220, 230 and 240.

The second forward speed ratio is established with the engagement of the clutches 250, 254 and 258. The clutch 250 connects the sun gear member 222 to the planet carrier assembly member 236. The clutch 254 connects the planet carrier assembly member 226 to the planet carrier assembly member 236. The clutch 258 connects the ring gear member 234 to the planet carrier assembly member 246. The ring gear member 224 rotates at the same speed as the output shaft 19. The planet carrier assembly member 226 rotates at the same speed as the planet carrier assembly member 236 and the sun gear member 222. The sun gear members 232, 242 do not rotate. The ring gear member 234 rotates at the same speed as the planet carrier assembly member 246. The planet carrier assembly member 236 rotates at a speed determined from the speed of the ring gear member 234, and the ring gear/sun gear tooth ratio of the planetary gear set 230. The ring gear member 244 rotates at the same speed as the input shaft 17. The planet carrier assembly member 246 rotates at a speed determined from the speed of the ring gear member 244, and the ring gear/sun gear tooth ratio of the planetary gear set 240. The numerical value of the second forward speed ratio is determined utilizing the ring gear/sun gear tooth ratios of the planetary gear sets 230 and 240.

The third forward speed ratio is established with the engagement of the clutches 250, 252 and 254. The clutch 250 connects the sun gear member 222 to the planet carrier assembly member 236. The clutch 252 connects the sun gear member 222 to the planet carrier assembly member 246. The clutch 254 connects the planet carrier assembly member 226 to the planet carrier assembly member 236. The ring gear member 224 rotates at the same speed as the output shaft 19. The planet carrier assembly members 226, 236 and 246 rotate at the same speed as the sun gear member 222. The sun gear members 232, 242 do not rotate. The ring gear member 244 rotates at the same speed as the input shaft 17. The planet carrier assembly member 246 rotates at a speed determined from the speed of the ring gear member 244, and the ring gear/sun gear tooth ratio of the planetary gear set 240. The numerical value of the third forward speed ratio is determined utilizing the ring gear/sun gear tooth ratio of the planetary gear set 240.

The fourth forward speed ratio is established with the engagement of the clutches 250, 254 and 256. In this configuration, the input shaft 17 is directly connected to the output shaft 19. The numerical value of the fourth forward speed ratio is 1.

The fifth forward speed ratio is established with the engagement of the clutches 250, 252 and 256. The clutch 250 connects the sun gear member 222 to the planet carrier assembly member 236. The clutch 252 connects the sun gear member 222 to the planet carrier assembly member 246. The clutch 256 connects the planet carrier assembly member 226 to the ring gear member 244. The ring gear member 224 rotates at the same speed as the output shaft 19. The planet carrier assembly member 226 and ring gear member 244 rotate at the same speed as the input shaft 17. The sun gear member 222 rotates at the same speed as the planet carrier assembly members 236, 246. The ring gear member 224, and therefore the output shaft 19, rotates at a speed determined from the speed of the planet carrier assembly member 226, the speed of the sun gear member 222, and the ring gear/sun gear tooth ratio of the planetary gear set 220. The sun gear members 232, 242 do not rotate. The planet carrier assembly member 246 rotates a speed determined from the speed of the ring gear member 244, and the ring gear/sun gear tooth ratio of the planetary gear set 240. The numerical value of the fifth forward speed ratio is determined utilizing the ring gear/sun gear tooth ratios of the planetary gear sets 220 and 240.

The sixth forward speed ratio is established with the engagement of the clutches 250, 256 and 258. The clutch 250 connects the sun gear member 222 to the planet carrier assembly member 236. The clutch 256 connects the planet carrier assembly member 226 to the ring gear member 244. The clutch 258 connects the ring gear member 234 to the planet carrier assembly member 246. The ring gear member 224 rotates at the same speed as the output shaft 19. The planet carrier assembly member 226 and ring gear member 244 rotate at the same speed as the input shaft 17. The sun gear member 222 rotates at the same speed as the planet carrier assembly member 236. The ring gear member 224, and therefore the output shaft 19, rotates at a speed determined from the speed of the planet carrier assembly member 226, the speed of the sun gear member 222, and the ring gear/sun gear tooth ratio of the planetary gear set 220. The sun gear members 232, 242 do not rotate. The ring gear member 234 rotates the same speed as the planet carrier assembly member 246. The planet carrier assembly member 236 rotates at a speed determined from the speed of the ring gear member 234, and the ring gear/sun gear tooth ratio of the planetary gear set 230. The planet carrier assembly member 246 rotates at a speed determined from the speed of the ring gear member 244, and the ring gear/sun gear tooth ratio of the planetary gear set 240. The numerical value of the sixth forward speed ratio is determined utilizing the ring gear/sun gear tooth ratios of the planetary gear sets 220, 230 and 240.

The seventh forward speed ratio is established with the engagement of the clutches 250, 256 and the brake 259. The clutch 250 connects the sun gear member 222 to the planet carrier assembly member 236. The clutch 256 connects the planet carrier assembly member 226 to the ring gear member 244. The brake 259 connects the planet carrier assembly member 236 to the transmission housing 260. The ring gear member 224 rotates at the same speed as the output shaft 19. The planet carrier assembly member 226 and ring gear member 244 rotate at the same speed as the input shaft 17. The sun gear member 222, planetary gear set 230, and sun gear member 242 do not rotate. The ring gear member 224, and therefore the output shaft 19, rotates at a speed determined from the speed of the planet carrier assembly member 226, and the ring gear/sun gear tooth ratio of the planetary gear set 220. The numerical value of the seventh forward speed ratio is determined utilizing the ring gear/sun gear tooth ratio of the planetary gear set 220.

As previously set forth, the truth table of FIG. 3*b* describes the combinations of engagements utilized for the seven forward speed ratios and reverse ratio. The truth table also provides an example of speed ratios that are available with the family member described above. These examples of speed ratios are determined utilizing the tooth ratios given in FIG. 3*b*. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3*b* is a chart representing the ratio steps between adjacent forward speed ratios and the reverse speed ratio. For example, the first to second ratio interchange has a step of 1.61. It can also be readily determined from the truth table of FIG. 3*b* that all of the single step forward ratio interchanges are of the single transition variety, as are all of the double step forward interchanges.

Figures 4A, 4B:
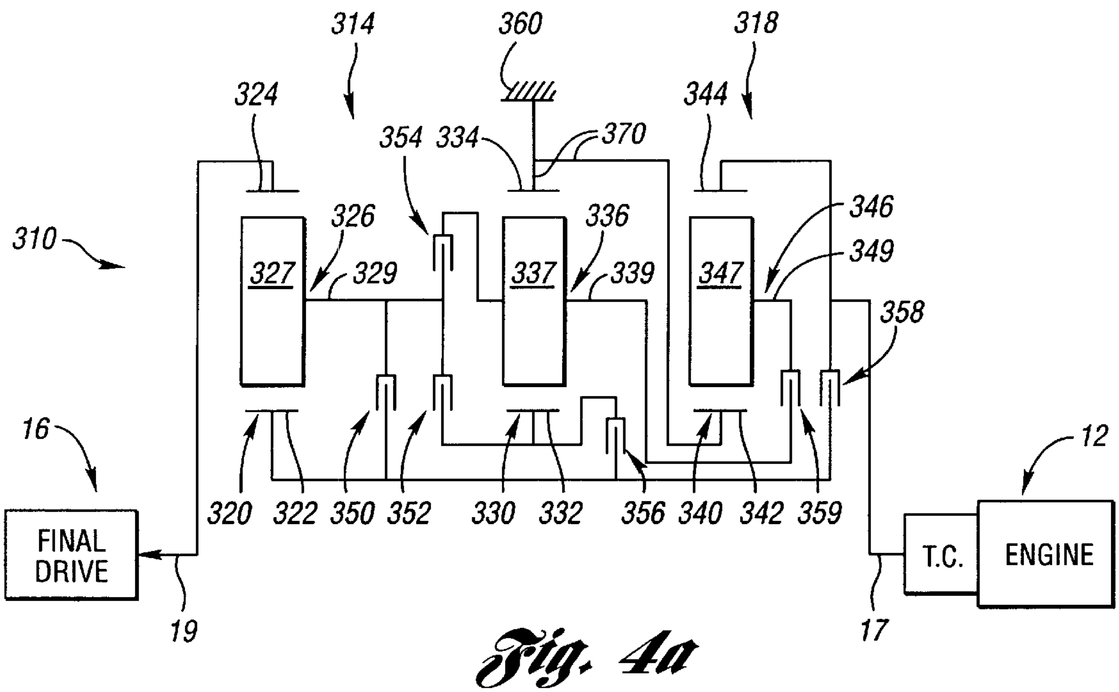
FIG. 4*a* is a schematic representation of a powertrain having a planetary transmission incorporating another family member of the present invention.
FIG. 4*b* is a truth table and chart depicting some of the operating characteristics of the powertrain shown in FIG. 4*a;*

A powertrain 310, shown in FIG. 4*a*, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes six torque-transmitting mechanisms 350, 352, 354, 356, 358 and 359, each of which is a rotating type torque-transmitting mechanism, commonly termed clutch.

The input shaft 17 is continuously connected with the ring gear member 344, and the output shaft 19 is continuously connected with the ring gear member 324. The ring gear member 334 is continuously connected with the sun gear member 342 and the transmission housing 360 through the interconnecting member 370.

The planet carrier assembly member 326 is selectively connectable with the sun gear member 322 through the clutch 350. The planet carrier assembly member 326 is selectively connectable with the sun gear member 332 through the clutch 352. The planet carrier assembly member 326 is selectively connectable with the planet carrier assembly member 336 through the clutch 354. The sun gear member 332 is selectively connectable with the sun gear member 322 through the clutch 356. The sun gear member 322 is selectively connectable with the ring gear member 344 through the clutch 358. The planet carrier assembly member 336 is selectively connectable with the planet carrier assembly member 346 through the clutch 359.

The truth tables given in FIGS. 4*b*, 5b, 6*b*, 7*b*, 8*b*, 9*b*, 10*b*, 11*b*, 12*b*, 13*b*, 14*b* and 15*b* show the engagement sequences for the torque-transmitting mechanisms to provide at least seven forward speed ratios and one reverse speed ratio. As shown and described above for the configuration in FIG. 1*a*, 2*a* and 3*a*, those skilled in the art will understand from the respective truth tables how the speed ratios are established through the planetary gear sets identified in the written description.

The truth table shown in FIG. 4*b* describes the engagement combination and the engagement sequence necessary to provide the reverse drive ratio and seven forward speed ratios. A sample of the numerical values for the ratios is also provided in the truth table of FIG. 4*b*. These values are determined utilizing the ring gear/sun gear tooth ratios also given in FIG. 4*b*. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4*b* is a chart describing the step ratios between the adjacent forward speed ratios and the reverse to first forward speed ratio. For example, the first to second forward speed ratio step is 1.5. It can be readily determined from the truth table of FIG. 4*b* that each of the forward single step ratio interchanges is a single transition shift, as are the double step interchanges. The chart also shows that the torque-transmitting mechanisms 354 and 358 can be engaged through the neutral condition to simplify the forward/reverse interchange.

Those skilled in the art will recognize that the numerical value of the reverse speed ratio is determined utilizing the ring gear/sun gear tooth ratio of the planetary gear set 320. The numerical value of the first forward speed ratio is determined utilizing the ring gear/sun gear tooth ratios of the planetary gear sets 320 and 330. The numerical values of the second and seventh forward speed ratios are determined utilizing the ring gear/sun gear tooth ratios of the planetary gear sets 320, 330 and 340. The numerical value of the third forward speed ratio is determined utilizing the ring gear/sun gear tooth ratios of the planetary gear sets 320 and 340. The numerical value of the fourth forward speed ratio is determined utilizing the ring gear/sun gear tooth ratio of the planetary gear set 340. The numerical value of the fifth forward speed ratio is 1. The numerical value of the sixth forward speed ratio is determined utilizing the ring gear/sun gear tooth ratios of the planetary gear sets 330 and 340.

Figures 5A, 5B:
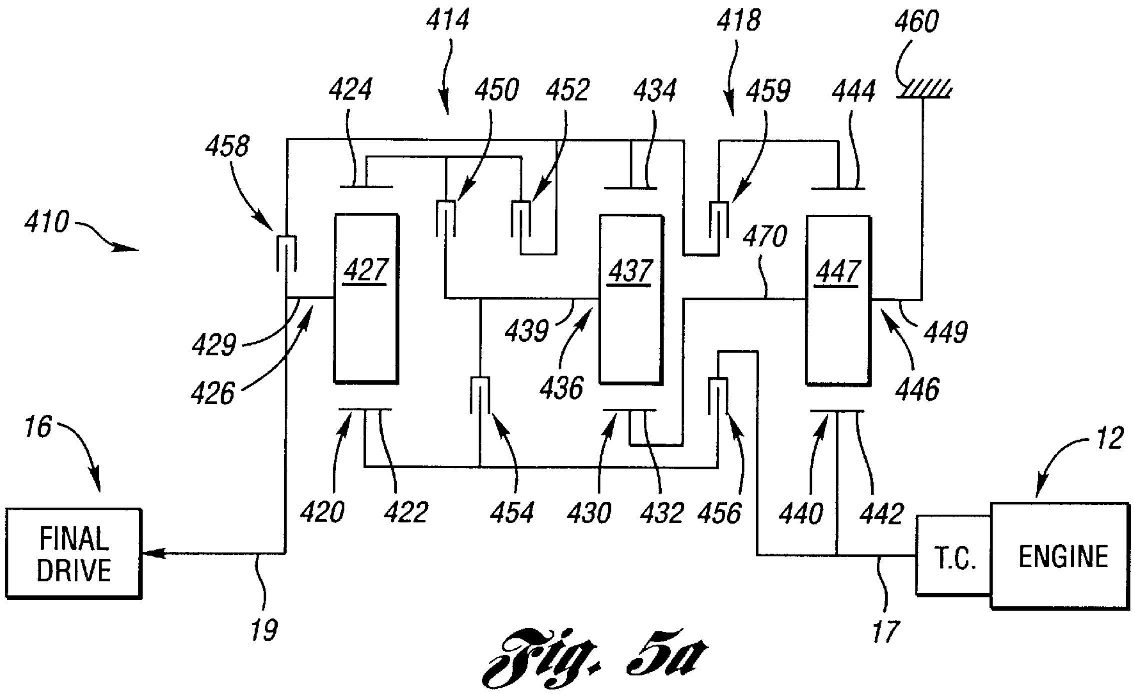
FIG. 5*a* is a schematic representation of a powertrain having a planetary transmission incorporating another family member of the present invention.
FIG. 5*b* is a truth table and chart depicting some of the operating characteristics of the powertrain shown in FIG. 5*a;*

A powertrain 410, shown in FIG. 5*a*, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes six torque-transmitting mechanisms 450, 452, 454, 456, 458 and 459, each of which is a rotating-type torque-transmitting mechanism, commonly termed clutch.

The input shaft 17 is continuously connected with the sun gear member 442, and the output shaft 19 is continuously connected with the planet carrier assembly member 426. The sun gear member 432 is continuously connected with the planet carrier assembly member 446 and the transmission housing 460 through the interconnecting member 470.

The ring gear member 424 is selectively connectable with the planet carrier assembly member 436 through the clutch 450. The ring gear member 424 is selectively connectable with the ring gear member 434 through the clutch 452. The sun gear member 422 is selectively connectable with the planet carrier assembly member 436 through the clutch 454. The sun gear member 422 is selectively connectable with the sun gear member 442 through clutch 456. The planet carrier assembly member 426 is selectively connectable with the ring gear member 434 through the clutch 458. The ring gear member 434 is selectively connectable with the ring gear member 444 through the clutch 459.

The truth table shown in FIG. 5*b* describes the engagement combination and sequence of the torque-transmitting mechanisms 450, 452, 454, 456, 458 and 459.

Also given in the truth table of FIG. 5*b* is a set of numerical values that are attainable with the present invention utilizing the ring gear/sun gear tooth ratios shown. The R1/S1 value is the tooth ratio of the planetary gear set 420; the R2/S2 value is the tooth ratio of the planetary gear set 430; and the R3/S3 value is the tooth ratio of the planetary gear set 440. As can also be determined from the truth table of FIG. 5*b*, the single step forward interchanges are single transition shifts, as are the double step interchanges in the forward direction.

FIG. 5*b* also provides a chart of the ratio steps between adjacent forward ratios and between the reverse and first forward ratio. For example, the ratio step between the first and second forward ratios is 1.4. Those skilled in the art will recognize that the numerical value of the reverse speed ratio is determined utilizing the ring gear/sun gear tooth ratio of the planetary gear set 440. The numerical value of the first forward speed ratio is determined utilizing the ring gear/sun gear tooth ratios of the planetary gear sets 420 and 440. The numerical value of the second forward speed ratio is determined utilizing the ring gear/sun gear tooth ratios of the planetary gear sets 420, 430 and 440. The numerical value of the third forward speed ratio is determined utilizing the ring gear/sun gear tooth ratio of the planetary gear sets 420. The numerical values of the fourth and sixth forward speed ratios are determined utilizing the ring gear/sun gear tooth ratios of the planetary gear sets 420 and 430. The numerical value of the fifth forward speed ratio is 1. The numerical value of the seventh forward speed ratio is determined utilizing the ring gear/sun gear tooth ratio of the planetary gear set 430.

Figures 6A, 6B:
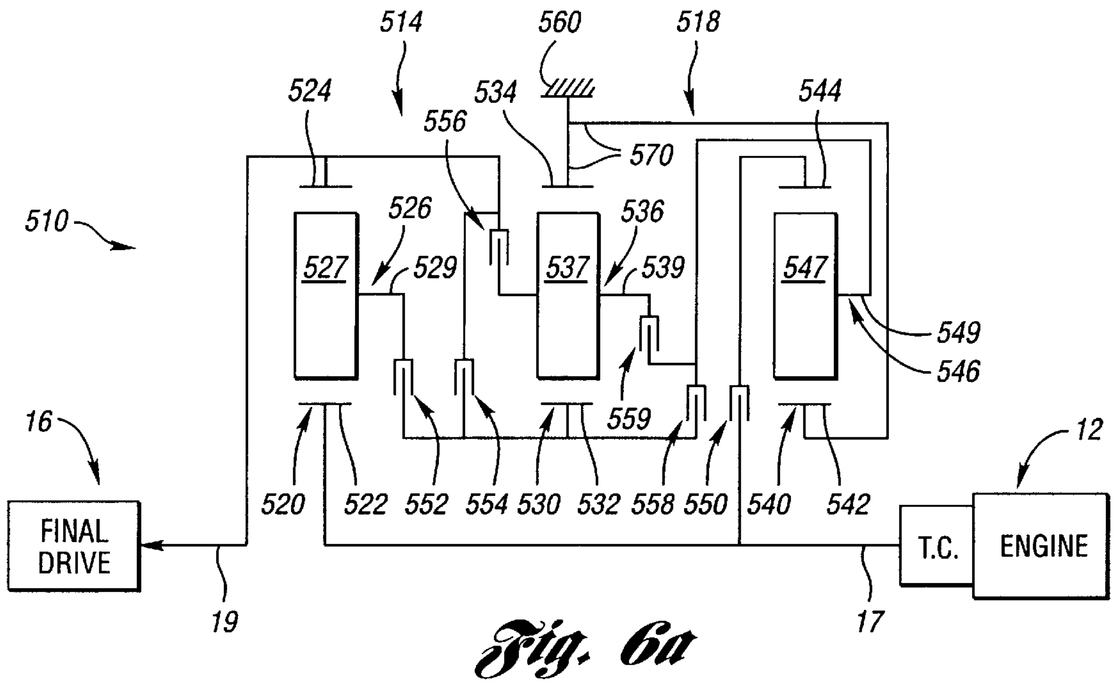
FIG. 6*a* is a schematic representation of a powertrain having a planetary transmission incorporating another family member of the present invention.
FIG. 6*b* is a truth table and chart depicting some of the operating characteristics of the powertrain shown in FIG. 6*a;*

A powertrain 510, shown in FIG. 6*a*, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes six torque-transmitting mechanisms 550, 552, 554, 556, 558 and 559, each of which is a rotating-type torque-transmitting mechanism, commonly termed clutch.

The input shaft 17 is continuously connected with the sun gear member 522, and the output shaft 19 is continuously connected with the ring gear member 524. The ring gear member 534 is continuously connected with the sun gear member 542 and with the transmission housing 560 through the interconnecting member 570.

The sun gear member 522 is selectively connectable with the ring gear member 544 through the clutch 550. The planet carrier assembly member 526 is selectively connectable with the sun gear member 532 through the clutch 552. The ring gear member 524 is selectively connectable with the sun gear member 532 through the clutch 554. The ring gear member 524 is selectively connectable with the planet carrier assembly member 536 through the clutch 556. The sun gear member 532 is selectively connectable with the planet carrier assembly member 546 through the clutch 558. The planet carrier assembly member 536 is selectively connectable with the planet carrier assembly member 546 through the clutch 559.

The truth table shown in FIG. 6*b* describes the engagement sequence and combination of the torque-transmitting mechanisms to provide the reverse speed ratio and seven forward speed ratios. It should be noted that the torque-transmitting mechanisms 552 and 558 can remain engaged through the neutral condition, thereby simplifying the forward/reverse interchange. It can also be determined from the truth table of FIG. 6*b* that all of the single step forward ratio interchanges are of the single transition variety, as are all of the double step forward interchanges. The chart of FIG. 6*b* describes the ratio steps between adjacent forward speed ratios and the ratio step between the reverse and first forward speed ratio.

Those skilled in the art, upon reviewing the truth table and the schematic representation of FIG. 6*a*, can determine that the numerical value of the reverse speed ratio is determined utilizing the ring gear/sun gear tooth ratio of the planetary gear set 520. The numerical value of the first forward speed ratio is determined utilizing the ring gear/sun gear tooth ratios of the planetary gear sets 520 and 530. The numerical values of the second and sixth forward speed ratios are determined utilizing the ring gear/sun gear tooth ratios of the planetary gear sets 530 and 540. The numerical value of the third forward speed ratio is determined utilizing the ring gear/sun gear tooth ratios of the planetary gear sets 520 and 540. The numerical value of the fourth forward speed ratio is determined utilizing the ring gear/sun gear tooth ratio of the planetary gear set 540. The numerical value of the fifth forward speed ratios is 1. The numerical value of the seventh forward speed ratio is determined utilizing the ring gear/sun gear tooth ratios of the planetary gear sets 520, 530 and 540.

The sample speed ratios given in the truth table are determined utilizing the tooth ratio values also given in FIG. 6*b*. The R1/S1 value is the tooth ratio of the planetary gear set 520; the R2/S2 value is the tooth ratio of the planetary gear set 530; and the R3/S3 value is the tooth ratio of the planetary gear set 540.

Figures 7A, 7B:
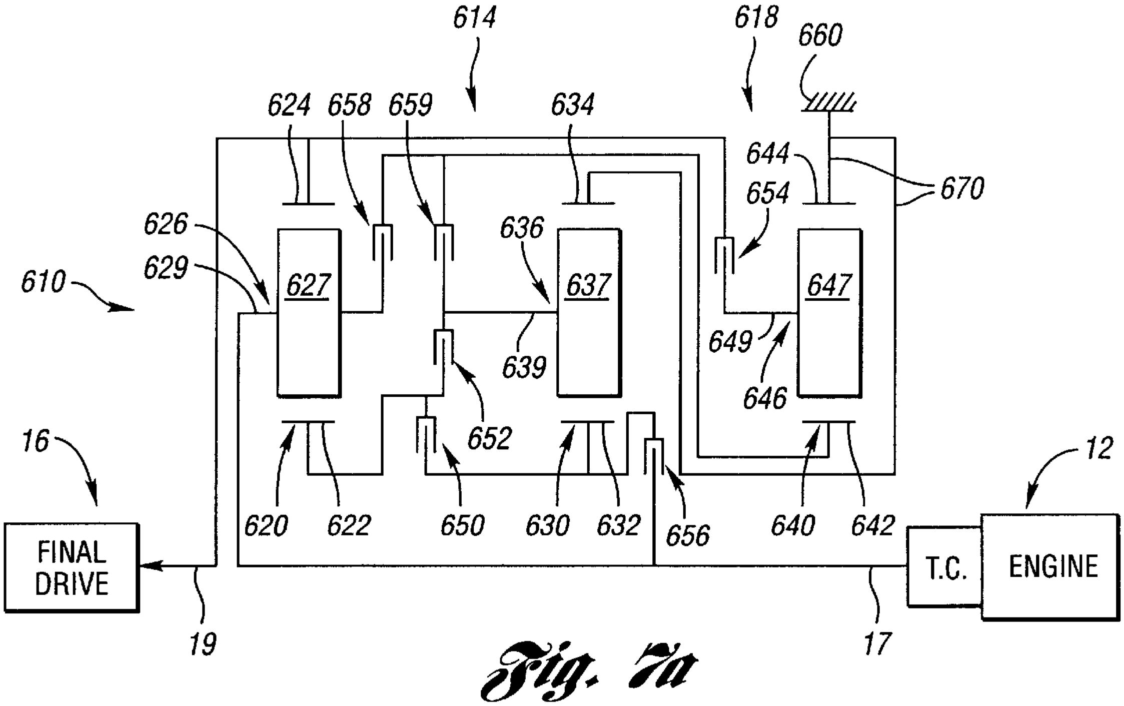
FIG. 7*a* is a schematic representation of a powertrain having a planetary transmission incorporating another family member of the present invention.
FIG. 7*b* is a truth table and chart depicting some of the operating characteristics of the powertrain shown in FIG. 7*a;*

A powertrain 610, shown in FIG. 7*a*, has the engine and torque converter 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes six torque-transmitting mechanisms 650, 652, 654, 656, 658 and 659, each of which is a rotating-type torque-transmitting mechanism, commonly termed clutch.

The input shaft 17 is continuously connected with the planet carrier assembly member 626, and the output shaft 19 is continuously connected with the ring gear member 624. The ring gear member 634 is continuously connected with the ring gear member 644 and with the transmission housing 660 through the interconnecting member 670.

The sun gear member 622 is selectively connectable with the sun gear member 632 through the clutch 650. The sun gear member 622 is selectively connectable with the planet carrier assembly member 636 through the clutch 652. The ring gear member 624 is selectively connectable with the planet carrier assembly member 646 through the clutch 654. The sun gear member 632 is selectively connectable with the planet carrier assembly member 626 through the clutch 656. The planet carrier assembly member 626 is selectively connectable with the sun gear member 642 through the clutch 658. The planet carrier assembly member 636 is selectively connectable with the sun gear member 642 through the clutch 659.

The truth table shown in FIG. 7*b* describes the combination of torque-transmitting mechanism engagements that will provide the reverse drive ratio and seven forward speed ratios, as well as the sequence of these engagements and interchanges. The torque-transmitting mechanisms 654 and 659 can be engaged through the neutral condition, thereby simplifying the forward/reverse interchange. It can be noted from the truth table that each of the single step forward interchanges are single transition ratio changes, as are the double step forward interchanges.

The ratio values given are by way of example and are established utilizing the ring gear/sun gear tooth ratios given in FIG. 7*b*. For example, the R1/S1 value is the tooth ratio of the planetary gear set 620; the R2/S2 value is the tooth ratio of the planetary gear set 630; and the R3/S3 value is the tooth ratio of the planetary gear set 640. The ratio steps between adjacent forward ratios and the reverse to first ratio are also given in FIG. 7*b*.

Those skilled in the art will, upon reviewing the truth table of FIG. 7*b*, recognize that numerical values of the reverse and sixth forward speed ratios are determined utilizing the ring gear/sun gear tooth ratios of the planetary gear sets 620 and 630. The numerical value of the first forward speed ratio is determined utilizing the ring gear/sun gear tooth ratios of the planetary gear sets 630 and 640. The numerical value of the second forward speed ratio is determined utilizing the ring gear/sun gear tooth ratios of the planetary gear set 620, 630 and 640. The numerical value of the third forward speed ratio is determined utilizing the ring gear/sun gear tooth ratio of the planetary gear set 640. The numerical value of the fourth forward speed ratio is determined utilizing the ring gear/sun gear tooth ratios of the planetary gear sets 620 and 640. The numerical value of the fifth forward speed ratio is 1. The numerical value of the seventh forward speed ratio is determined utilizing the ring gear/sun gear tooth ratio of the planetary gear set 620.

Figures 8A, 8B:
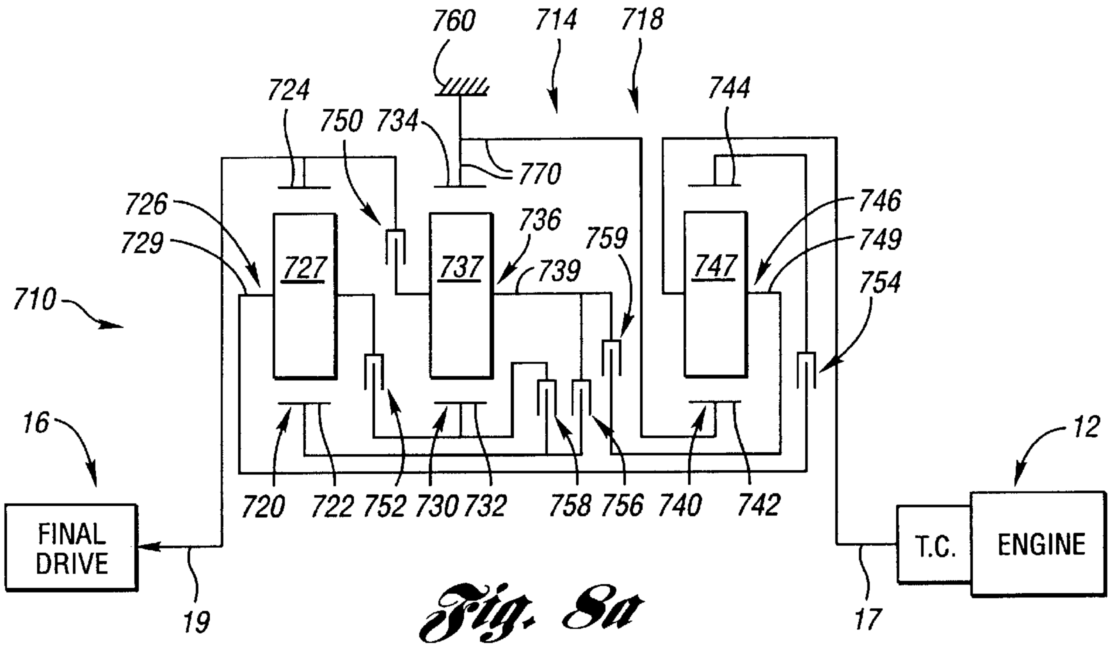
FIG. 8*a* is a schematic representation of a powertrain having a planetary transmission incorporating another family member of the present invention.
FIG. 8*b* is a truth table and chart depicting some of the operating characteristics of the powertrain shown in FIG. 8*a;*

A powertrain 710, shown in FIG. 8*a*, has the conventional engine and torque converter 12, a planetary transmission 714, and the conventional final drive mechanism 16. The engine and torque converter 12 are drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly

726. The planet carrier assembly 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear arrangement 718 also includes six torque-transmitting mechanisms 750, 752, 754, 756, 758 and 759, each of which is a rotating-type torque-transmitting mechanism, commonly termed clutch.

The input shaft 17 is continuously connected with the planet carrier assembly member 746, and the output shaft 19 is continuously connected with the ring gear member 724. The ring gear member 734 is continuously connected with the sun gear member 742 and with the transmission housing 760 through the interconnecting member 770.

The ring gear member 724 is selectively connectable with the planet carrier assembly member 736 through the clutch 750. The planet carrier assembly member 726 is selectively connectable with the sun gear member 732 through the clutch 752. The planet carrier assembly member 726 is selectively connectable with the ring gear member 744 through the clutch 754. The sun gear member 722 is selectively connectable with the planet carrier assembly member 736 through clutch 756. The sun gear member 722 is selectively connectable with the sun gear member 732 through the clutch 758. The planet carrier assembly member 736 is selectively connectable with the planet carrier assembly member 746 through the clutch 759.

The truth table of FIG. 8*b* defines the torque-transmitting mechanism engagement sequence utilized for each of the nine forward speed ratios and the reverse speed ratio. Also given in the truth table is a set of numerical values that are attainable with the present invention utilizing the ring gear/sun gear tooth ratios given in FIG. 8*b*. The R1/S1 value is the tooth ratio of the planetary gear set 720; the R2/S2 value is the tooth ratio of the planetary gear set 730; and the R3/S3 value is the tooth ratio of the planetary gear set 740.

FIG. 8*b* also provides a chart of the ratio steps between adjacent forward ratios and between the reverse and first forward ratio. For example, the ratio step between the first and second forward ratios is 1.81. Those skilled in the art will recognize that the numerical values of the reverse, second and sixth forward speed ratios are determined utilizing the ring gear/sun gear tooth ratios of the planetary gear sets 720, 730 and 740. The numerical value of the first forward speed ratio is determined utilizing the ring gear/sun gear tooth ratios of the planetary gear sets 730 and 740. The numerical value of the third forward speed ratio is 1. The numerical value of the fourth forward speed ratio is determined utilizing the ring gear/sun gear tooth ratio of the planetary gear set 740. The numerical values of the fifth and seventh forward speed ratios are determined utilizing the ring gear/sun gear tooth ratios of the planetary gear sets 720 and 740. The numerical value of the eighth forward speed ratio is determined utilizing the ring gear/sun gear tooth ratio of the planetary gear set 730. The numerical value of the ninth forward speed ratio is determined utilizing the ring gear/sun gear tooth ratios of the planetary gear sets 720 and 730.

Figures 9A, 9B:
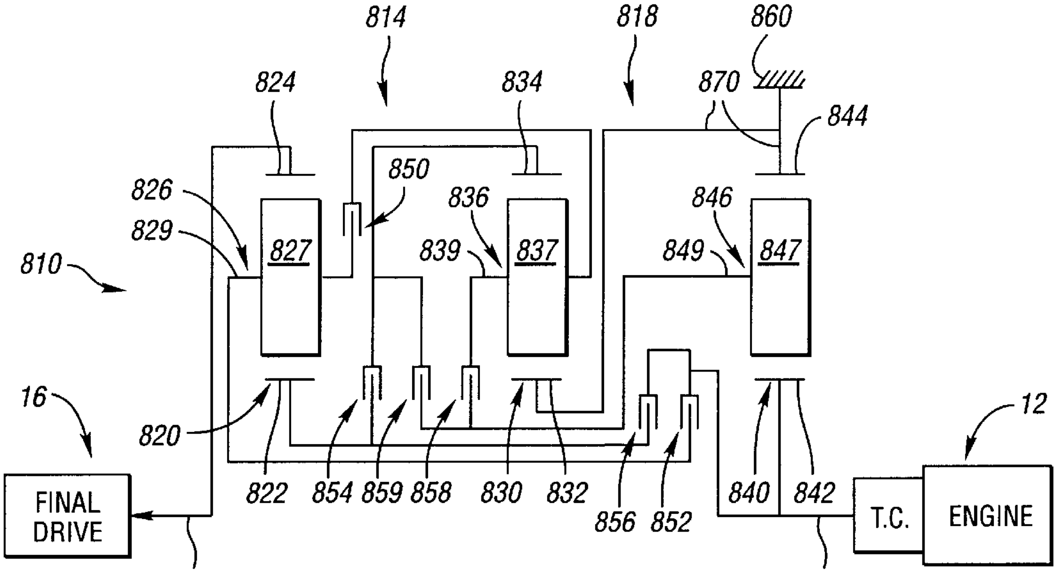
FIG. 9*a* is a schematic representation of a powertrain having a planetary transmission incorporating another family member of the present invention.
FIG. 9*b* is a truth table and chart depicting some of the operating characteristics of the powertrain shown in FIG. 9*a;*

A powertrain 810, shown in FIG. 9*a*, has the conventional engine and torque converter 12, a planetary transmission 814, and the final drive mechanism 16. The engine and torque converter 12 are drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

The planetary gear arrangement 818 also includes six torque-transmitting mechanisms 850, 852, 854, 856, 858 and 859, each of which is a rotating-type torque-transmitting mechanism, commonly termed clutch.

The input shaft 17 is continuously connected with the sun gear member 842, and the output shaft 19 is continuously connected with the ring gear member 824. The sun gear member 832 is continuously connected with the ring gear member 844 and with the transmission housing 860 through the interconnecting member 870.

The planet carrier assembly member 826 is selectively connectable with the planet carrier assembly member 836 through the clutch 850. The planet carrier assembly member 826 is selectively connectable with the sun gear member 842 through the clutch 852. The sun gear member 822 is selectively connectable with the ring gear member 834 through the clutch 854. The sun gear member 822 is selectively connectable with the sun gear member 842 through the clutch 856. The planet carrier assembly member 836 is selectively connectable with the planet carrier assembly member 846 through the clutch 858. The ring gear member 834 is selectively connectable with the planet carrier assembly member 846 through the clutch 859.

The truth table shown in FIG. 9*b* defines the torque-transmitting mechanism engagement sequence that provides the reverse ratio and seven forward speed ratios shown in the truth table and available with the planetary gear arrangement 818. The truth table indicates that the torque-transmitting mechanisms 850 and 856 can remain engaged through the neutral condition, thereby simplifying the forward/reverse interchange. A sample of numerical values for the individual ratios is also given in the truth table of FIG. 9*b*. These numerical values have been calculated using the ring gear/sun gear tooth ratios also given by way of example in FIG. 9*b*. The R1/S1 value is the tooth ratio of the planetary gear set 820; the R2/S2 value is the tooth ratio of the planetary gear set 830; and the R3/S3 value is the tooth ratio of the planetary gear set 840. It can be readily recognized from the truth table that all of the single step and double step forward interchanges are single transition ratio interchanges. FIG. 9*b* also describes the ratio steps between adjacent forward ratios and between the reverse and first forward ratio. For example, the ratio step between the first and second forward ratios is 1.54.

Those skilled in the art of planetary transmissions will recognize that the numerical values of the reverse, first, second and sixth forward speed ratios are determined utilizing the ring gear/sun gear tooth ratios of the planetary gear sets 820, 830 and 840. The numerical values of the third and fourth forward speed ratios are determined utilizing the ring gear/sun gear tooth ratios of the planetary gear sets 820 and 830. The numerical value of the fifth forward speed ratio is 1. The numerical value of the seventh forward speed ratio is determined utilizing the ring gear/sun gear tooth ratios of the planetary gear sets 820 and 840.

Figures 10A, 10B:
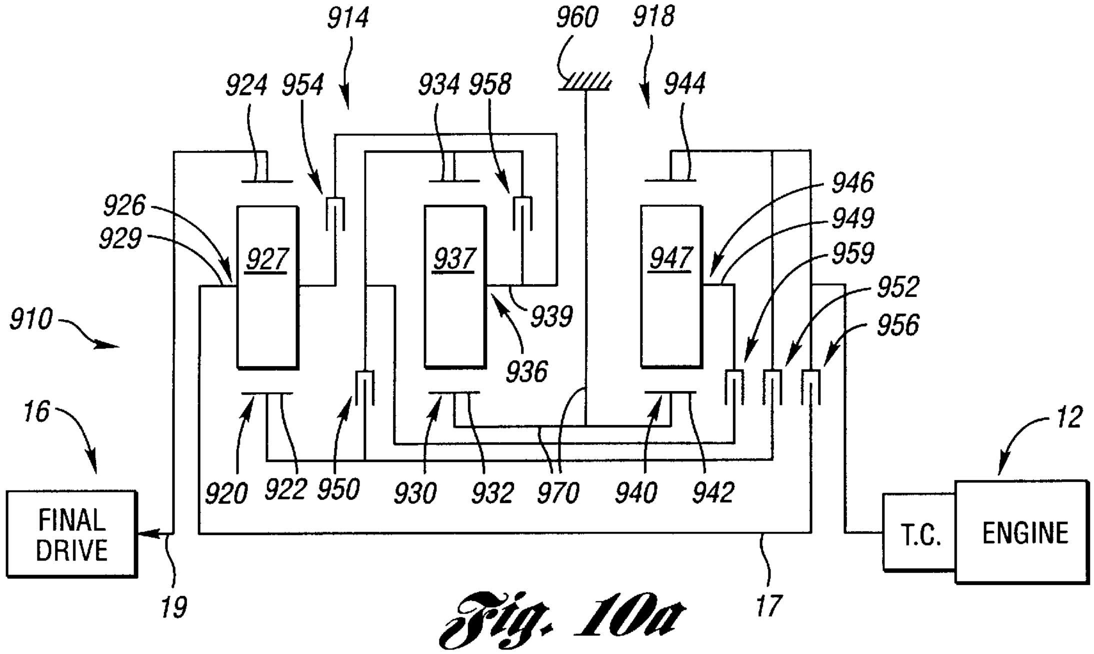
FIG. 10*a* is a schematic representation of a powertrain having a planetary transmission incorporating another family member of the present invention.
FIG. 10*b* is a truth table and chart depicting some of the operating characteristics of the powertrain shown in FIG. 10*a;*

The powertrain 910, shown in FIG. 10*a*, includes the conventional engine and torque converter 12, a planetary transmission 914, and the conventional final drive mechanism 16. The engine and torque converter 12 are drivingly connected with the planetary transmission 914 through the input shaft 17. The planetary transmission 914 is drivingly connected with the final drive mechanism 16 through the output shaft 19. The planetary transmission 914 includes a planetary gear arrangement 918 that has a first planetary gear set 920, a second planetary gear set 930, and a third planetary gear set 940.

The planetary gear set 920 includes a sun gear member 922, a ring gear member 924, and a planet carrier assembly 926. The planet carrier assembly 926 includes a plurality of pinion gears 927 that are rotatably mounted on a carrier member 929 and disposed in meshing relationship with the sun gear member 922 and the ring gear member 924, respectively.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the sun gear member 932 and the ring gear member 934. The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear arrangement 918 also includes six torque-transmitting mechanisms 950, 952, 954, 956, 958 and 959, each of which is a rotating-type torque-transmitting mechanism, commonly termed clutch.

The input shaft 17 is continuously connected with the ring gear member 944, and the output shaft 19 is continuously connected with the ring gear member 924. The sun gear member 932 is continuously connected with the sun gear member 942 and with the transmission housing 960 through the interconnecting member 970.

The sun gear member 922 is selectively connectable with the ring gear member 934 through the clutch 950. The sun gear member 922 is selectively connectable with the ring gear member 944 through the clutch 952. The planet carrier assembly member 926 is selectively connectable with the planet carrier assembly member 936 through the clutch 954. The planet carrier assembly member 926 is selectively connectable with the ring gear member 944 through the clutch 956. The ring gear member 934 is selectively connectable with the planet carrier assembly member 946 through the clutch 958. The ring gear member 934 is selectively connectable with the planet carrier assembly member 946 through the clutch 959.

The truth table of FIG. 10*b* describes the torque-transmitting mechanism engagement sequence utilized to provide the reverse speed ratio and seven forward speed ratios. The truth table also provides a set of examples for the ratios for each of the reverse and forward speed ratios. These numerical values have been determined utilizing the ring gear/sun gear tooth ratios given in FIG. 10*b*. The R1/S1 value is the tooth ratio of the planetary gear set 920; the R2/S2 value is the tooth ratio of the planetary gear set 930; and the R3/S3 value is the tooth ratio of the planetary gear set 940. It can also be determined from the truth table of FIG. 10*b* that each of the forward single step ratio interchanges are of the single transition variety.

Those skilled in the art, upon reviewing the engagement combinations, will recognize that the numerical values of the reverse and seventh forward speed ratios are determined utilizing the ring gear/sun gear tooth ratio of the planetary gear set 920. The numerical values of the first and second forward speed ratios are determined utilizing the ring gear/sun gear tooth ratios of the planetary gear sets 920, 930 and 940. The numerical values of the third and fourth forward speed ratios are determined utilizing the ring gear/sun gear tooth ratios of the planetary gear sets 920 and 930. The numerical value of the fifth forward speed ratio is 1. The numerical value of the sixth forward speed ratio is determined utilizing the ring gear/sun gear tooth ratios of the planetary gear sets 920 and 940.

Figures 11A, 11B:
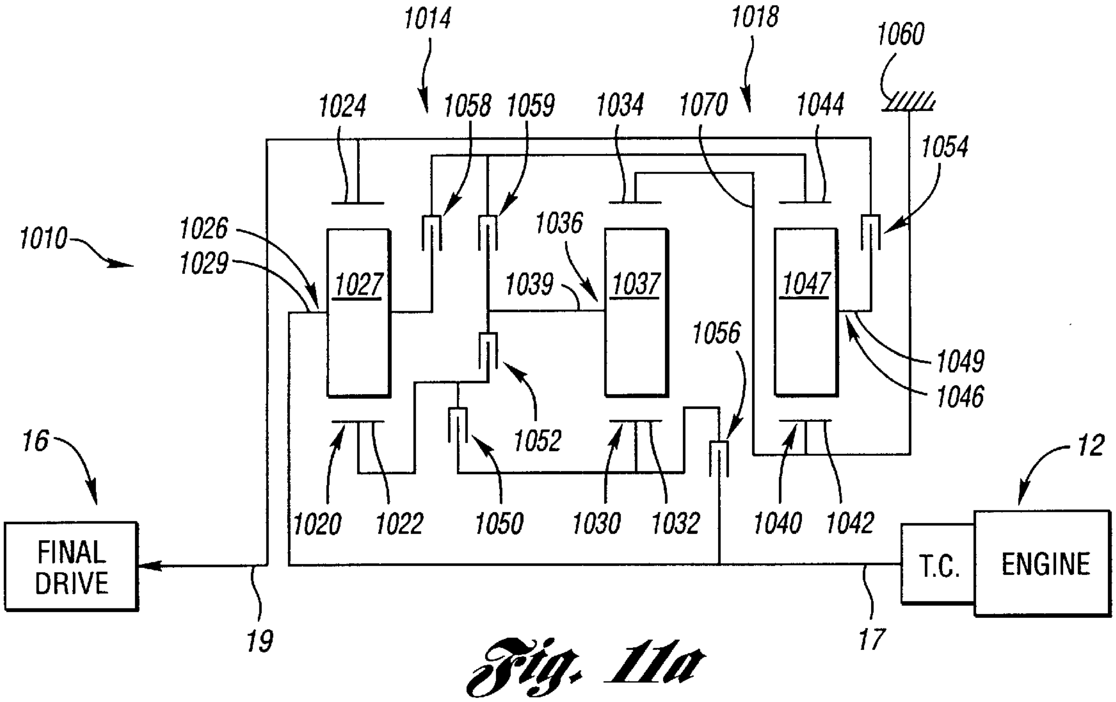
FIG. 11*a* is a schematic representation of a powertrain having a planetary transmission incorporating another family member of the present invention.
FIG. 11*b* is a truth table and chart depicting some of the operating characteristics of the powertrain shown in FIG. 11*a;*

A powertrain 1010, shown in FIG. 11*a*, includes the conventional engine and torque converter 12, a planetary transmission 1014, and the conventional final drive mechanism 16. The engine and torque converter are drivingly connected with the planetary transmission 1014 through the input shaft 17. The planetary transmission 1014 is drivingly connected with the final drive mechanism 16 through the output shaft 19. The planetary transmission 1014 includes a planetary gear arrangement 1018 that has a first planetary gear set 1020, a second planetary gear set 1030, and a third planetary gear set 1040.

The planetary gear set 1020 includes a sun gear member 1022, a ring gear member 1024, and a planet carrier assembly 1026. The planet carrier assembly 1026 includes a plurality of pinion gears 1027 rotatably mounted on a carrier member 1029 and disposed in meshing relationship with both the sun gear member 1022 and the ring gear member 1024.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the sun gear member 1032 and the ring gear member 1034.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the sun gear member 1042 and the ring gear member 1044.

The planetary gear arrangement 1018 also includes six torque-transmitting mechanisms 1050, 1052, 1054, 1056, 1058 and 1059, each of which is a rotating-type torque-transmitting mechanism, commonly termed clutch.

The input shaft 17 is continuously connected with the planet carrier assembly member 1026, and the output shaft 19 is continuously connected with the ring gear member 1024. The ring gear member 1034 is continuously connected with the sun gear member 1042 and with the transmission housing 1060 through the interconnecting member 1070.

The sun gear member 1022 is selectively connectable with the sun gear member 1032 through the clutch 1050. The sun gear member 1022 is selectively connectable with the planet carrier assembly member 1036 through the clutch 1052. The ring gear member 1024 is selectively connectable with the planet carrier assembly member 1046 through the clutch 1054. The planet carrier assembly member 1026 is selectively connectable with the sun gear member 1032 through the clutch 1058. The planet carrier assembly member 1026 is selectively connectable with the ring gear member 1044 through the clutch 1058. The planet carrier assembly member 1036 is selectively connectable with the ring gear member 1044 through the clutch 1059.

The truth table shown in FIG. 11*b* describes the engagement combinations and the engagement sequence necessary to provide the reverse drive ratio and the seven forward speed ratios. A sample of the numerical values for the ratios is also provided in the truth table of FIG. 11*b*. These values are determined utilizing the ring gear/sun gear tooth ratios also given in FIG. 11*b*. The R1/S1 value is the tooth ratio for the planetary gear set 1020; the R2/S2 value is the tooth ratio for the planetary gear set 1030; and the R3/S3 value is the tooth ratio for the planetary gear set 1040. Also given in FIG. 11*b* is a chart describing the step ratios between the adjacent forward speed ratios and the reverse to first forward speed ratio.

Those skilled in the art will recognize that the numerical values of the reverse and sixth forward speed ratios are determined utilizing the ring gear/sun gear tooth ratios of the planetary gear sets 1020 and 1030. The numerical value of the first forward speed ratio is determined utilizing the ring gear/sun gear tooth ratios of the planetary gear sets 1030 and 1040. The numerical value of the second forward speed ratio is determined utilizing the ring gear/sun gear tooth ratios of the planetary gear sets 1020, 1030 and 1040. The numerical value of the third forward speed ratio is determined utilizing the ring gear/sun gear tooth ratio of the planetary gear set 1040. The numerical value of the fourth forward speed ratio is determined utilizing the ring gear/sun gear tooth ratios of the planetary gear sets 1020 and 1040. The numerical value of the fifth forward speed ratio is 1. The numerical value of the seventh forward speed ratio is determined utilizing the ring gear/sun gear tooth ratio of the planetary gear set 1020.

Figures 12A, 12B:
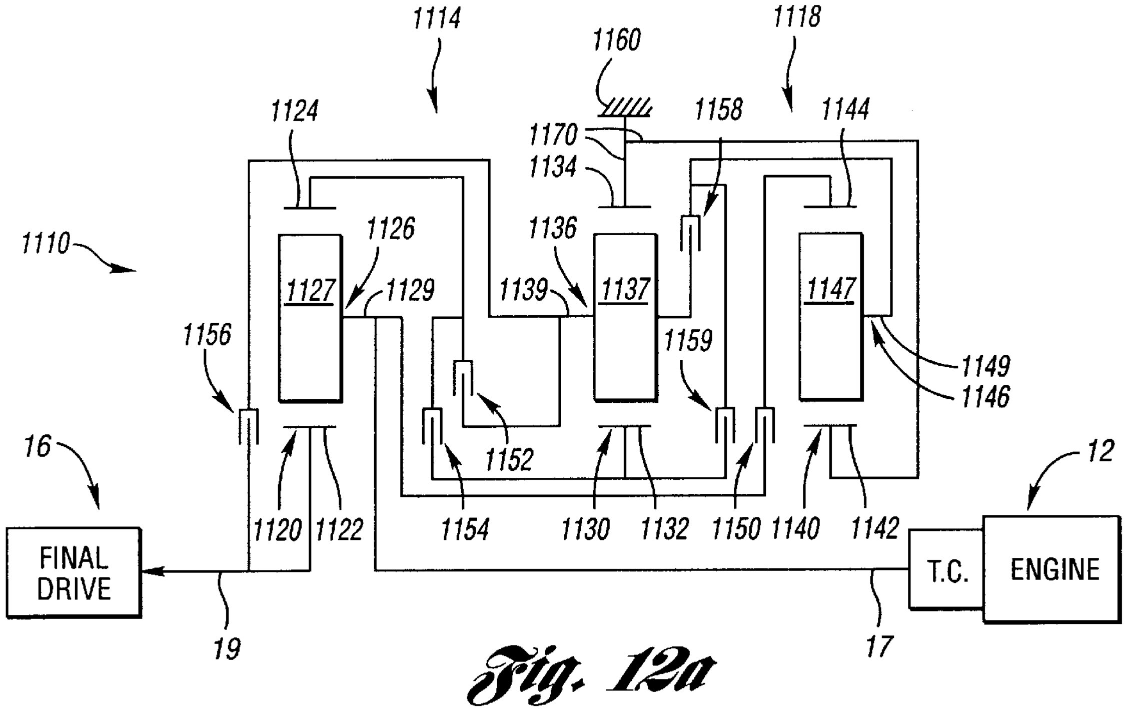
FIG. 12*a* is a schematic representation of a powertrain having a planetary transmission incorporating another family member of the present invention.
FIG. 12*b* is a truth table and chart depicting some of the operating characteristics of the powertrain shown in FIG. 12*a;*

A powertrain 1110, shown in FIG. 12*a*, has a conventional engine and torque converter 12, a planetary transmission 1114, and the conventional final drive mechanism 16. The planetary transmission 1114 includes a planetary gear arrangement 1118 which is connected with the engine and torque converter 12 through the input shaft 17 and with the final drive mechanism 16 through the output shaft 19. The planetary gear arrangement 1118 includes three planetary gear sets 1120, 1130 and 1140.

The planetary gear set 1120 includes a sun gear member 1122, a ring gear member 1124, and a planet carrier assembly 1126. The planet carrier assembly 1126 includes a plurality of pinion gears 1127 rotatably mounted on a carrier member 1129 and disposed in meshing relationship with both the sun gear member 1122 and the ring gear member 1124.

The planetary gear set 1130 includes a sun gear member 1132, a ring gear member 1134, and a planet carrier assembly member 1136. The planet carrier assembly member 1136 includes a plurality of intermeshing pinion gears 1137 that are rotatably mounted on a carrier member 1139 and disposed in meshing relationship with both the sun gear member 1132 and the ring gear member 1134.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

The planetary gear arrangement 1118 also includes six torque-transmitting mechanisms 1150, 1152, 1154, 1156, 1158 and 1159, each of which is a rotating-type torque-transmitting mechanism, commonly termed clutch.

The input shaft 17 is continuously connected with the planet carrier assembly member 1126, and the output shaft 19 is continuously connected with the sun gear member 1122. The ring gear member 1134 is continuously connected with the sun gear member 1142 and with the transmission housing 1160 through the interconnecting member 1170.

The planet carrier assembly member 1126 is selectively connectable with the ring gear member 1144 through the clutch 1150. The ring gear member 1124 is selectively connectable with the planet carrier assembly member 1136 through the clutch 1152. The ring gear member 1124 is selectively connectable with the sun gear member 1132 through the clutch 1154. The sun gear member 1122 is selectively connectable with the planet carrier assembly member 1136 through the clutch 1156. The planet carrier assembly member 1136 is selectively connectable with the planet carrier assembly member 1146 through the clutch 1158. The sun gear member 1132 is selectively connectable with the planet carrier assembly member 1146 through the clutch 1159.

The truth table shown in FIG. 12*b* describes the engagement sequence and engagement combinations utilized with the present family member to provide a reverse drive ratio and seven forward speed ratios. The truth table of FIG. 12*b* also provides a set of example numbers that can be established in the planetary gear arrangement 1118 utilizing the ring gear/sun gear tooth ratios. The R1/S1 value is the ring gear/sun gear tooth ratio of the planetary gear set 1120; the R2/S2 value is the ring gear/sun gear tooth ratio of the planetary gear set 1130; and the R3/S3 value is the ring gear/sun gear tooth ratio of the planetary gear set 1140.

The chart of FIG. 12*b* describes the ratio steps between adjacent forward speed ratios for a seven-speed transmission. These step ratios are established utilizing the example speed ratios given in the truth table. As also shown in the truth table, the torque-transmitting mechanisms 1150 and 1156 can remain engaged through the neutral condition, thereby simplifying the forward/reverse interchange.

Those skilled in the art will recognize that the numerical values of the reverse and sixth forward speed ratios are determined utilizing the ring gear/sun gear tooth ratios of the planetary gear sets 1120, 1130 and 1140. The numerical value of the first forward speed ratio is determined utilizing the ring gear/sun gear tooth ratios of the planetary gear sets 1130 and 1140. The numerical value of the second forward speed ratio is determined utilizing the ring gear/sun gear tooth ratios of the planetary gear sets 1120 and 1130. The numerical value of the third forward speed ratio is determined utilizing the ring gear/sun gear tooth ratio of the planetary gear set 1140. The numerical value of the fourth forward speed ratio is 1. The numerical value of the fifth forward speed ratio is determined utilizing the ring gear/sun gear tooth ratios of the planetary gear sets 1120 and 1140. The numerical value of the seventh forward speed ratio is determined utilizing the ring gear/sun gear tooth ratio of the planetary gear set 1120.

Figures 13A, 13B:
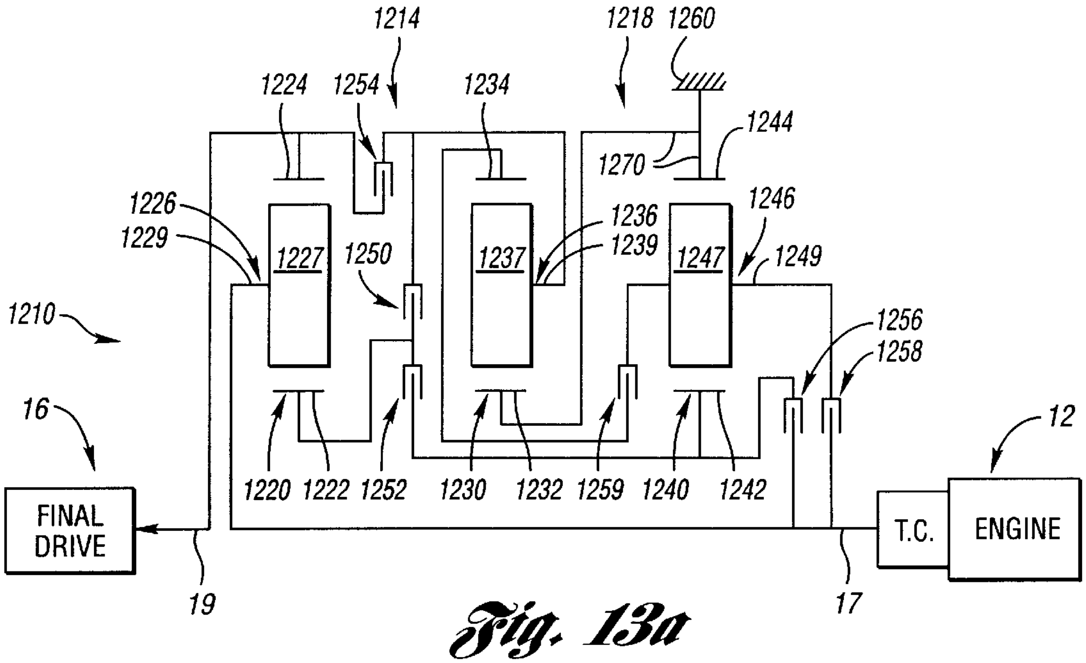
FIG. 13*a* is a schematic representation of a powertrain having a planetary transmission incorporating another family member of the present invention.
FIG. 13*b* is a truth table and chart depicting some of the operating characteristics of the powertrain shown in FIG. 13*a;*

A powertrain 1210, shown in FIG. 13*a*, includes the conventional engine and torque converter 12, a planetary transmission 1214, and the conventional final drive mechanism 16. The engine and torque converter are drivingly connected with the planetary transmission 1214 through the input shaft 17. The planetary transmission 1214 is drivingly connected with the final drive mechanism 16 through the output shaft 19. The planetary transmission 1214 includes a planetary gear arrangement 1218 that has a first planetary gear set 1220, a second planetary gear set 1230, and a third planetary gear set 1240.

The planetary gear set 1220 includes a sun gear member 1222, a ring gear member 1224, and a planet carrier assembly 1226. The planet carrier assembly 1226 includes a plurality of pinion gears 1227 rotatably mounted on a carrier member 1229 and disposed in meshing relationship with both the sun gear member 1222 and the ring gear member 1224.

The planetary gear set 1230 includes a sun gear member 1232, a ring gear member 1234, and a planet carrier assembly member 1236. The planet carrier assembly member 1236 includes a plurality of pinion gears 1237 rotatably mounted on a carrier member 1239 and disposed in meshing relationship with both the sun gear member 1232 and the ring gear member 1234.

The planetary gear set 1240 includes a sun gear member 1242, a ring gear member 1244, and a planet carrier assembly member 1246. The planet carrier assembly member 1246 includes a plurality of pinion gears 1247 rotatably mounted on a carrier member 1249 and disposed in meshing relationship with both the sun gear member 1242 and the ring gear member 1244.

The planetary gear arrangement 1218 also includes six torque transmitting mechanisms 1250, 1252, 1254, 1256, 1258 and 1259, each of which is a rotating-type torque-transmitting mechanism, commonly termed clutch.

The input shaft 17 is continuously connected with the planet carrier assembly member 1226, and the output shaft 19 is continuously connected with the ring gear member 1224. The ring gear member 1232 is continuously connected with the ring gear member 1244 and with the transmission housing 1260 through the interconnecting member 1270.

The sun gear member 1222 is selectively connectable with the planet carrier assembly member 1236 through the clutch 1250. The sun gear member 1222 is selectively connectable with the sun gear member 1242 through the clutch 1252. The ring gear member 1224 is selectively connectable with the planet carrier assembly member 1236 through the clutch 1254. The sun gear member 1242 is selectively connectable with the planet carrier assembly member 1226 through the clutch 1256. The planet carrier assembly member 1246 is selectively connectable with the planet carrier assembly member 1226 through the clutch 1258. The ring gear member 1234 is selectively connectable with the planet carrier assembly member 1246 through the clutch 1259.

The truth table shown in FIG. 13*b* describes the engagement combinations and the engagement sequence necessary to provide the reverse drive ratio and seven forward speed ratios. A sample of the numerical values for the ratios is also provided in the truth table of FIG. 13*b*. These values are determined utilizing the ring gear/sun gear tooth ratios also given in FIG. 13*b*. The R1/S1 value is the tooth ratio for the planetary gear set 1220; the R2/S2 value is the tooth ratio for the planetary gear set 1230; and the R3/S3 value is the tooth ratio for the planetary gear set 1240. Also given in FIG. 13*b* is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratios of the planetary gear sets 1220 and 1240. The numerical value of the first forward speed ratio is determined utilizing the ring gear/sun gear tooth ratios of the planetary gear sets 1230 and 1240. The numerical values of the second, sixth and seventh forward speed ratios are determined utilizing the ring gear/sun gear tooth ratios of the planetary gear sets 1220, 1230 and 1240. The numerical value of the third forward speed ratio is determined utilizing the ring gear/sun gear tooth ratio of the planetary gear set 1230. The numerical value of the fourth forward speed ratio is 1. The numerical value of the fifth forward speed ratio is determined utilizing the ring gear/sun gear tooth ratios of the planetary gear sets 1220 and 1230.

Figures 14A, 14B:
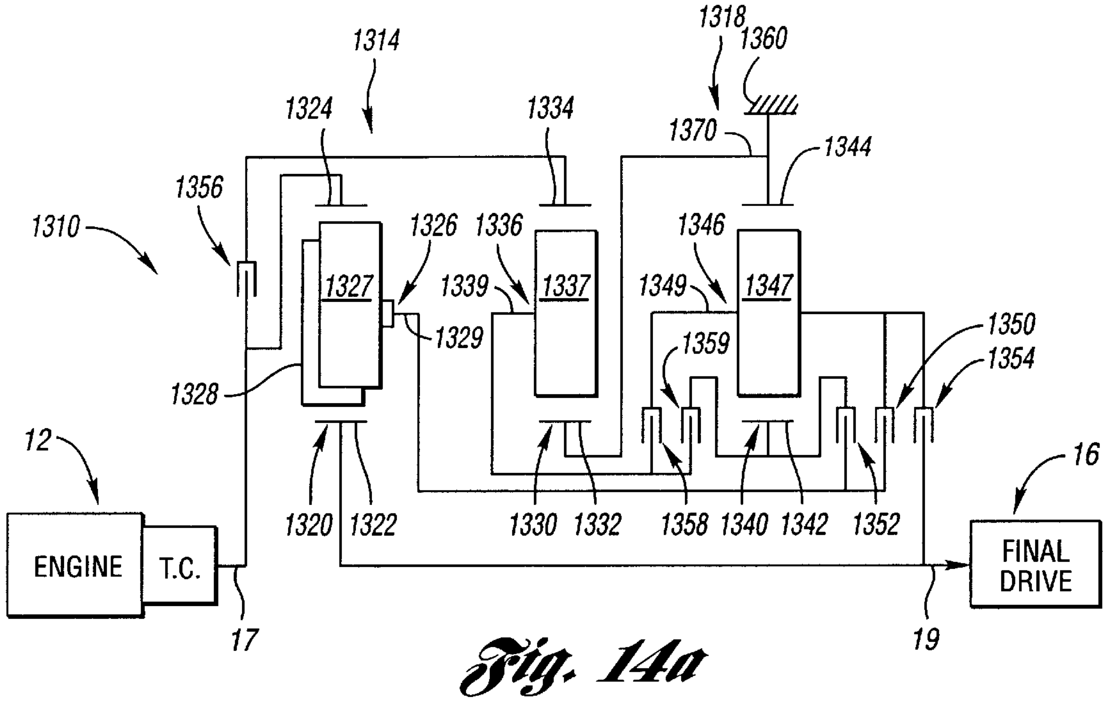
FIG. 14*a* is a schematic representation of a powertrain having a planetary transmission incorporating another family member of the present invention.
FIG. 14*b* is a truth table and chart depicting some of the operating characteristics of the powertrain shown in FIG. 14*a;*

A powertrain 1310, shown in FIG. 14*a*, includes the conventional engine and torque converter 12, a planetary transmission 1314, and the conventional final drive mechanism 16. The engine and torque converter are drivingly connected with the planetary transmission 1314 through the input shaft 17. The planetary transmission 1314 is drivingly connected with the final drive mechanism 16 through the output shaft 19. The planetary transmission 1314 includes a planetary gear arrangement 1318 that has a first planetary gear set 1320, a second planetary gear set 1330, and a third planetary gear set 1340.

The planetary gear set 1320 includes a sun gear member 1322, a ring gear member 1324, and a planet carrier assembly 1326. The planet carrier assembly 1326 includes a plurality of pinion gears 1327 and 1328 rotatably mounted on a carrier member 1329 and disposed in meshing relationship with both the sun gear member 1322 and the ring gear member 1324.

The planetary gear set 1330 includes a sun gear member 1332, a ring gear member 1334, and a planet carrier assembly member 1336. The planet carrier assembly member 1336 includes a plurality of pinion gears 1337 rotatably mounted on a carrier member 1339 and disposed in meshing relationship with both the sun gear member 1332 and the ring gear member 1334.

The planetary gear set 1340 includes a sun gear member 1342, a ring gear member 1344, and a planet carrier assembly member 1346. The planet carrier assembly member 1346 includes a plurality of pinion gears 1347 rotatably mounted on a carrier member 1349 and disposed in meshing relationship with both the sun gear member 1342 and the ring gear member 1344.

The planetary gear arrangement 1318 also includes six torque transmitting mechanisms 1350, 1352, 1354, 1356,

1358 and 1359, each of which is a rotating-type torque-transmitting mechanism, commonly termed clutch.

The input shaft 17 is continuously connected with the ring gear member 1324, and the output shaft 19 is continuously connected with the sun gear member 1322. The sun gear member 1332 is continuously connected with the ring gear member 1344 and with the transmission housing 1360 through the interconnecting member 1370.

The planet carrier assembly member 1326 is selectively connectable with the planet carrier assembly member 1346 through the clutch 1350. The planet carrier assembly member 1326 is selectively connectable with the sun gear member 1342 through the clutch 1352. The sun gear member 1322 is selectively connectable with the planet carrier assembly member 1346 through the clutch 1354. The ring gear member 1324 is selectively connectable with the ring gear member 1334 through clutch 1356. The planet carrier assembly member 1336 is selectively connectable with the planet carrier assembly member 1346 through the clutch 1358. The planet carrier assembly member 1336 is selectively connectable with the sun gear member 1342 through the clutch 1359.

The truth table shown in FIG. 14*b* describes the engagement combinations and the engagement sequence necessary to provide the reverse drive ratio and the seven forward speed ratios. A sample of the numerical values for the ratios is also provided in the truth table of FIG. 14*b*. These values are determined utilizing the ring gear/sun gear tooth ratios also given in FIG. 14*b*. The R1/S1 value is the tooth ratio for the planetary gear set 1320; the R2/S2 value is the tooth ratio for the planetary gear set 1330; and the R3/S3 value is the tooth ratio for the planetary gear set 1340. Also given in FIG. 14*b* is a chart describing the step ratios between the adjacent forward speed ratios and the reverse to first forward speed ratio.

Those skilled in the art will recognize that the numerical values of the reverse and sixth forward speed ratios are determined utilizing the ring gear/sun gear tooth ratios of the planetary gear sets 1320 and 1340. The numerical value of the first forward speed ratio is determined utilizing the ring gear/sun gear tooth ratios of the planetary gear sets 1330 and 1340. The numerical value of the second forward speed ratio is determined utilizing the ring gear/sun gear tooth ratios of the planetary gear sets 1320 and 1340. The numerical value of the third forward speed ratio is determined utilizing the ring gear/sun gear tooth ratio of the planetary gear set 1330. The numerical value of the fourth forward speed ratio is 1. The numerical value of the fifth forward speed ratio is determined utilizing the ring gear/sun gear tooth ratios of the planetary gear sets 1320 and 1330. The numerical value of the seventh forward speed ratio is determined utilizing the ring gear/sun gear tooth ratio of the planetary gear set 1320.

Figures 15A, 15B:
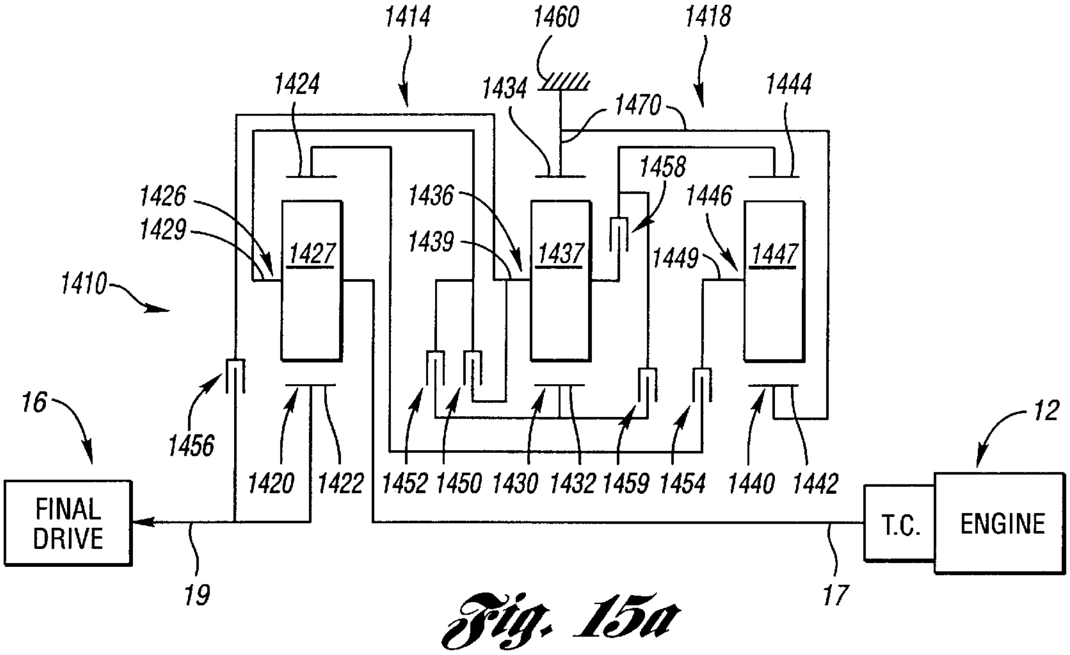
FIG. 15*a* is a schematic representation of a powertrain having a planetary transmission incorporating another family member of the present invention.
FIG. 15*b* is a truth table and chart depicting some of the operating characteristics of the powertrain shown in FIG. 15*a*.

A powertrain 1410, shown in FIG. 15*a*, includes the conventional engine and torque converter 12, a planetary transmission 1414, and the conventional final drive mechanism 16. The engine and torque converter are drivingly connected with the planetary transmission 1414 through the input shaft 17. The planetary transmission 1414 is drivingly connected with the final drive mechanism 16 through the output shaft 19. The planetary transmission 1414 includes a planetary gear arrangement 1418 that has a first planetary gear set 1420, a second planetary gear set 1430, and a third planetary gear set 1440.

The planetary gear set 1420 includes a sun gear member 1422, a ring gear member 1424, and a planet carrier assembly 1426. The planet carrier assembly 1426 includes a plurality of pinion gears 1427 rotatably mounted on a carrier member 1429 and disposed in meshing relationship with both the sun gear member 1422 and the ring gear member 1424.

The planetary gear set 1430 includes a sun gear member 1432, a ring gear member 1434, and a planet carrier assembly member 1436. The planet carrier assembly member 1436 includes a plurality of pinion gears 1437 rotatably mounted on a carrier member 1439 and disposed in meshing relationship with both the sun gear member 1432 and the ring gear member 1434.

The planetary gear set 1440 includes a sun gear member 1442, a ring gear member 1444, and a planet carrier assembly member 1446. The planet carrier assembly member 1446 includes a plurality of pinion gears 1447 rotatably mounted on a carrier member 1449 and disposed in meshing relationship with both the sun gear member 1442 and the ring gear member 1444.

The planetary gear arrangement 1418 also includes six torque transmitting mechanisms 1450, 1452, 1454, 1456, 1458 and 1459, each of which is a rotating-type torque-transmitting mechanism, commonly termed clutch.

The input shaft 17 is continuously connected with the planet carrier assembly member 1426, and the output shaft 19 is continuously connected with the sun gear member 1422. The sun gear member 1442 is continuously connected with the ring gear member 1434 and with the transmission housing 1460 through the interconnecting member 1470.

The planet carrier assembly member 1426 is selectively connectable with the planet carrier assembly member 1436 through the clutch 1450. The planet carrier assembly member 1426 is selectively connectable with the sun gear member 1432 through the clutch 1452. The ring gear member 1424 is selectively connectable with the planet carrier assembly member 1446 through the clutch 1454. The sun gear member 1422 is selectively connectable with the planet carrier assembly member 1436 through the clutch 1456. The planet carrier assembly member 1436 is selectively connectable with the ring gear member 1444 through clutch 1458. The sun gear member 1432 is selectively connectable with the ring gear member 1444 through the clutch 1459.

The truth table shown in FIG. 15*b* describes the engagement combinations and the engagement sequence necessary to provide the reverse drive ratio and the seven forward speed ratios. A sample of the numerical values for the ratios is also provided in the truth table of FIG. 15*b*. These values are determined utilizing the ring gear/sun gear tooth ratios also given in FIG. 15*b*. The R1/S1 value is the tooth ratio for the planetary gear set 1420; the R2/S2 value is the tooth ratio for the planetary gear set 1430; and the R3/S3 value is the tooth ratio for the planetary gear set 1440. Also given in FIG. 15*b* is a chart describing the step ratios between the adjacent forward speed ratios and the reverse to first forward speed ratio.

Those skilled in the art will recognize that the numerical values of the reverse, second and sixth forward speed ratios are determined utilizing the ring gear/sun gear tooth ratios of the planetary gear sets 1420, 1430 and 1440. The numerical value of the first forward speed ratio is determined utilizing the ring gear/sun gear tooth ratio of the planetary gear set 1430. The numerical value of the third forward speed ratio is 1. The numerical values of the fourth and fifth forward speed ratios are determined utilizing the ring gear/sun gear tooth ratios of the planetary gear sets 1420 and 1440. The numerical value of the seventh forward speed ratio is determined utilizing the ring gear/sun gear tooth ratio of the planetary gear set 1420.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:

an input shaft;

an output shaft;

first, second and third planetary gear sets each having first, second and third members;

said input shaft being continuously interconnected with a member of said planetary gear sets, and said output shaft being continuously interconnected with another member of said planetary gear sets;

a first interconnecting member continuously interconnecting said first member of said first planetary gear set with said first member of said second planetary gear set and with a stationary member;

a first torque-transmitting mechanism selectively interconnecting said second member of said first planetary gear set with said first member of said third planetary gear set;

a second torque-transmitting mechanism selectively interconnecting said second member of said second planetary gear set with said second member of said third planetary gear set;

a third torque-transmitting mechanism selectively interconnecting a member of said third planetary gear set with a member of said first or second planetary gear set;

a fourth torque-transmitting mechanism selectively interconnecting a member of said first or second planetary gear set with a member of said third planetary gear set;

a fifth torque-transmitting mechanism selectively interconnecting a member of said first or second planetary gear set with another member of said first, second or third planetary gear set;

a sixth torque-transmitting mechanism selectively interconnecting a member of said first, second or third planetary gear set with another member of said first, second or third planetary gear set, or with said stationary member; and said torque-transmitting mechanisms being engaged in combinations of three to establish at least seven forward speed ratios and a reverse speed ratio between said input shaft and said output shaft.

2. The transmission defined in claim 1, wherein said first, second, third, fourth, fifth and sixth torque-transmitting mechanisms comprise clutches.

3. The transmission defined in claim 1, wherein said first, second, third, fourth and fifth torque-transmitting mechanisms comprise clutches, and said sixth torque-transmitting mechanism comprises a brake.

4. The transmission defined in claim 1, wherein planet carrier assembly members of each of said planetary gear sets are single-pinion carriers.

5. The transmission defined in claim 1, wherein at least one planet carrier assembly member of said planetary gear sets is a double-pinion carrier.

6. A multi-speed transmission comprising:

an input shaft;

an output shaft;

a planetary gear arrangement having first, second and third planetary gear sets, each planetary gear set having first, second and third members;

said input shaft being continuously interconnected with a member of said planetary gear sets, and said output shaft being continuously interconnected with another member of said planetary gear sets;

a first interconnecting member continuously interconnecting said first member of said first planetary gear set with said first member of said second planetary gear set and with a stationary member; and six torque-transmitting mechanisms for selectively interconnecting said members, to establish combinations of members joined for common rotation, said six torque-transmitting mechanisms being engaged in combinations of three to establish at least seven forward speed ratios and one reverse speed ratio between said input shaft and said output shaft.

7. The transmission defined in claim 6, wherein a first of said six torque-transmitting mechanisms is operable for selectively connecting said second member of said first planetary gear set with said first member of said third planetary gear set.

8. The transmission defined in claim 6, wherein a second of said six torque-transmitting mechanisms is operable for selectively interconnecting said second member of said second planetary gear set with said second member of said third planetary gear set.

9. The transmission defined in claim 6, wherein a third of said six torque-transmitting mechanisms is operable for selectively interconnecting a member of said third planetary gear set with a member of said first or second planetary gear set.

10. The transmission defined in claim 6, wherein a fourth of said six torque-transmitting mechanisms is selectively operable for interconnecting a member of said first or second planetary gear set with a member of said third planetary gear set.

11. The transmission defined in claim 6, wherein a fifth of said six torque-transmitting mechanisms is selectively operable for interconnecting a member of said first or second planetary gear set with another member of said first, second or third planetary gear sets.

12. The transmission defined in claim 6, wherein a sixth of said six torque-transmitting mechanisms selectively interconnects a member of said first, second or third planetary gear set with another member of said planetary gear sets, or with said stationary member.

13. The transmission in claim 6, wherein planet carrier assembly members of each of said planetary gear sets are single-pinion carriers.

14. The transmission in claim 6, wherein at least one planet carrier assembly member of said planetary gear sets is a double-pinion carrier.

* * * * *